US012532219B2

(12) United States Patent
Liao et al.

(10) Patent No.: US 12,532,219 B2
(45) Date of Patent: Jan. 20, 2026

(54) COMMUNICATION METHOD AND APPARATUS, AND COMPUTER-READABLE STORAGE MEDIUM FOR DATA TRANSMISSION

(71) Applicant: HUAWEI TECHNOLOGIES CO., LTD., Shenzhen (CN)

(72) Inventors: Shuri Liao, Shanghai (CN); Shengyue Dou, Shanghai (CN); Yuejun Wei, Shanghai (CN); Kedi Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 18/305,124

(22) Filed: Apr. 21, 2023

(65) Prior Publication Data

US 2023/0262519 A1    Aug. 17, 2023

Related U.S. Application Data

(63) Continuation of application No. PCT/CN2020/122978, filed on Oct. 22, 2020.

(51) Int. Cl.
*H04W 28/06* (2009.01)
*H04W 28/24* (2009.01)

(52) U.S. Cl.
CPC .......... *H04W 28/06* (2013.01); *H04W 28/24* (2013.01)

(58) Field of Classification Search
CPC . H04W 24/02; H04W 16/28; H04W 28/0268; H04W 28/06; H04W 72/11; H04W 76/28
See application file for complete search history.

(56) References Cited

U.S. PATENT DOCUMENTS

| | | | |
|---|---|---|---|
| 2013/0308461 A1 | 11/2013 | Stanwood et al. | |
| 2016/0119862 A1 | 4/2016 | Rinne et al. | |
| 2018/0359189 A1* | 12/2018 | Ye | H04N 23/698 |
| 2021/0218790 A1* | 7/2021 | Ringenberg | H04L 65/61 |
| 2023/0078636 A1* | 3/2023 | Wang | H04W 72/02 |
| | | | 370/329 |

FOREIGN PATENT DOCUMENTS

| | | |
|---|---|---|
| CN | 101969403 A | 2/2011 |
| CN | 103209494 A | 7/2013 |
| CN | 104202826 A | 12/2014 |
| CN | 107371029 A | 11/2017 |
| WO | 2017091961 A1 | 6/2017 |

OTHER PUBLICATIONS

"3rd Generation Partnership Project; Technical Specification Group Services and System Aspects; Extended Reality (XR) in 5G (Release 16)," 3GPP TR 26.928 V16.0.0, Total 131 pages, 3rd Generation Partnership Project, Valbonne, France (Mar. 2020).

* cited by examiner

*Primary Examiner* — Iqbal Zaidi
(74) *Attorney, Agent, or Firm* — Leydig, Voit & Mayer, Ltd.

(57) ABSTRACT

A communication method and apparatus, and a computer-readable storage medium are provided. The method includes: obtaining average user-experience information; obtaining quality impairment information of a data packet; and sending the data packet to a terminal based on a priority of the data packet, wherein the priority of the data packet is related to the quality impairment information of the data packet and/or the average user-experience information.

20 Claims, 9 Drawing Sheets

COMMUNICATION METHOD AND APPARATUS, AND COMPUTER-READABLE STORAGE MEDIUM FOR DATA TRANSMISSION

CROSS-REFERENCE TO RELATED APPLICATIONS

This application is a continuation of International Application No. PCT/CN2020/122978, filed on Oct. 22, 2020, the disclosure of which is hereby incorporated by reference in its entirety.

TECHNICAL FIELD

Embodiments of this application relate to the field of communication technologies, and specifically, to a communication method and apparatus, and a computer-readable storage medium.

BACKGROUND

In a wireless communication network, an extended reality (XR) technology has advantages such as multi-view and strong interactivity, can provide brand new visual experience for users, and has a great application value and business potential. XR includes technologies such as virtual reality (VR), augmented reality (AR), and mixed reality (MR), and can be widely applied to many fields such as entertainment, gaming, medical care, advertising, industry, online education, and engineering.

In an end-to-end transmission architecture, transmission scheduling is performed by using a blind pipe for transmission of XR service data, targeting a throughput or a system rate for transmission. However, for an XR service, a high throughput or a high system rate does not mean high experience quality of the user. In addition, the XR data is invisible in pipe transmission. For example, a frame position corresponding to a data packet in each frame of the XR data is invisible in a transmission process. Consequently, objective impact on the XR data in network transmission cannot be accurately measured, and a network operator cannot be systematically helped to perform network optimization for the XR data. Therefore, how to more systematically and objectively measure the impact on the XR data in the network transmission to guide a network design and guide the network operator to perform network optimization for the XR data becomes a problem that needs to be urgently resolved.

SUMMARY

This application provides a communication method and apparatus, and a computer-readable storage medium, so that impact on XR data in network transmission can be objectively measured, to determine transmission of the XR data.

According to a first aspect, this application provides a communication method. The communication method may be performed by a network device (for example, a core network device, an access network device, a Wi-Fi router, or a Wi-Fi access point), or may be performed by a chip, a chip system, a processor, or the like that supports the network device in implementing the method. The following provides descriptions by using an example in which the communication method is performed by the network device. The communication method may be for determining transmission of XR data, and may include: obtaining average user-experience information; obtaining quality impairment information of a data packet; and sending the data packet to a terminal based on a priority of the data packet, where the priority of the data packet is related to the quality impairment information of the data packet and/or the average user-experience information.

In the solution provided in this application, the quality impairment information of the data packet may indicate a degree of impact of a data packet loss on experience quality of data received by a user, and the average user-experience information may indicate average experience quality of data received by the user within a period of time. The priority of the data packet is determined based on the quality impairment information of the data packet and/or the average user-experience information. Therefore, according to the method, objective impact on data in network transmission can be systematically assessed. The priority of the data packet is determined, and the data packet is sent to the terminal based on the priority of the data packet, so that a network design can be guided, data transmission can be determined, and a network operator can be guided to perform network maintenance and optimization based on a requirement of the data.

In a possible implementation, the communication method may further include: obtaining first delay information of the data packet and/or first reliability information of the data packet, where the priority of the data packet is further related to the first delay information of the data packet and/or the first reliability information of the data packet.

In the solution provided in this application, delay information may be for measuring a delay requirement of end-to-end transmission of the data packet in a delay dimension. The delay information may further indicate a delay status of the data packet on a transmission node, for example, a delay margin on a current transmission node. Reliability information of the data packet may be for measuring a reliability requirement of the end-to-end transmission of the data packet. The reliability information of the data packet may further indicate a reliability status of the data packet on the transmission node, for example, a reliability requirement of transmission on the current transmission node. The reliability information of the data packet may further include frame integrity information. The frame integrity information may be for measuring a whole frame corresponding to the data packet and a transmission status of the current whole frame. The network device obtains the first delay information of the data packet and/or the first reliability information of the data packet, for example, a network information record of delay and/or reliability information of the data packet passing through a node in a transmission process. The network device may determine the end-to-end delay requirement of the data packet, a delay margin on the network device, and the reliability requirement of the data packet based on the first delay information of the data packet and/or the first reliability information of the data packet, to determine delay urgency and a robustness requirement of data packet transmission, thereby increasing or decreasing the priority of the data packet transmission based on the delay urgency and the robustness requirement of the data packet transmission. The network device may determine, based on the frame integrity information, a current frame corresponding to the data packet and a transmission status of the current frame, for example, whether the current frame is completely transmitted, and then further determine the priority of the data packet.

Optionally, the delay information may include packet delay budget (PDB) information and/or delay variation information. The PDB information indicates a PDB, and the PDB indicates duration within which the data packet needs to be correctly transmitted. The delay variation information indicates a variation of a delay. Optionally, the delay information may further include average delay information and/or delay variance information. The average delay information indicates an average value of the delay or the PDB within a period of time. The delay variance information indicates a variance of the delay. The first delay information of the data packet may include delay impact caused when a source end performs source encoding and delay impact on the data during transmission in a network. The foregoing specific delay information can be for measuring, in different dimensions, delay impact on the data during the end-to-end transmission, so that the network design can be guided, and the network operator can be guided to perform network maintenance and optimization based on the delay requirement of the data.

Optionally, the reliability information may include one or more of packet error rate (PER) information, block error rate (BLER) information, retransmission information, average packet loss rate information, or burst packet loss rate information. The PER information indicates a ratio of a number of incorrectly received data packets to a total number of received data packets. The BLER information indicates a ratio of a number of incorrectly received data blocks to a total number of received data blocks. The retransmission information may indicate, for example, a number of times of hybrid automatic repeat request (HARQ) retransmission. The average packet loss rate information may indicate a packet loss rate within a period of time. The burst packet loss rate information may indicate a packet loss rate of a burst service with a time period from start to end. The first reliability information of the data packet may include encoding error impact caused when the source end performs source encoding and transmission error impact on the data during transmission in the network. The foregoing specific reliability information can be for measuring, in different dimensions, the transmission error impact on the data during the end-to-end transmission, so that the network operator can be guided to perform network maintenance and optimization based on the reliability requirement of the data.

In a possible implementation, the priority of the data packet, the quality impairment information of the data packet, the average user-experience information, and the first delay information of the data packet and/or the first reliability information of the data packet satisfy:

$$F=\alpha*f1+\beta*f2+\gamma*f3;$$

$$F=\alpha*f1+\beta*f2+\delta*f4; \text{ or}$$

$$F=\alpha*f1+\beta+f2+\gamma*f3+\delta+f4$$

where $\alpha$, $\beta$, $\gamma$, and $\delta$ are coefficients greater than 0, F represents a value corresponding to the priority of the data packet, $f1$ represents a value corresponding to the quality impairment information of the data packet, $f2$ represents a value corresponding to the average user-experience information, $f3$ represents a value corresponding to the first delay information of the data packet, and $f4$ represents a value corresponding to the first reliability information of the data packet.

In the solution provided in this application, the priority of the data packet is determined based on the first delay information of the data packet and/or the first reliability information of the data packet, and the quality impairment information of the data packet and/or the average user-experience information. Specifically, the priority of the data packet may be determined in a manner such as by using a function, through formula calculation, or through neural network training, so that the priority of the data packet is determined more accurately, and the network design can be better guided, to send the data packet to the terminal.

In a possible implementation, the communication method may further include: obtaining source characteristic information of the data packet.

In the solution provided in this application, the network device may obtain the source characteristic information from the source end. The source end may be a cloud server or another terminal. The source end may perform rendering and encoding/decoding on source data of a service to obtain the data packet and the source characteristic information corresponding to the data packet.

In a possible implementation, the source characteristic information includes group of pictures (GOP) information corresponding to the data packet and frame information corresponding to the data packet.

In the solution provided in this application, the source characteristic information may include the GOP information corresponding to the data packet and the frame information corresponding to the data packet. The GOP information corresponding to the data packet may be, for example, media GOP information. The frame information corresponding to the data packet may include a frame type and a frame number of the data packet, position information of the data packet in a frame, and the like. For example, the source characteristic information may be the GOP information, the frame type corresponding to the data packet (an intra-coded picture (I frame), a predictive-coded picture (P frame), or a bidirectionally predicted picture (B frame)), the frame number corresponding to the data packet, a number of macroblocks (NumMBs) (where the macroblock refers to a block area obtained through division during source encoding) included in the data packet, a number of bits included in a macroblock (NumBitsPerMB), a position of the data packet in the frame, namely, measurement of a distance between an area in which the data packet is located and an edge of the frame (DevFromBdr), a number of bits (NumBits) included in a network abstract layer unit (NAL Unit), whether the data packet belongs to a full network abstract layer unit (IsFullUnit and NotFullUnit), and whether the data packet is a whole frame (IsWholeFrame and NotWholeFrame).

In a possible implementation, the communication method may further include: obtaining packet loss information and/or delay information of the data packet. The obtaining average user-experience information includes: determining the average user-experience information based on the source characteristic information and the packet loss information and/or the delay information of the data packet.

In the solution provided in this application, the average user-experience information may be determined based on the source characteristic information and the packet loss information of the data packet, the average user-experience information may be determined based on the source characteristic information and the delay information of the data packet, or the average user-experience information may be determined based on the source characteristic information, the packet loss information of the data packet, and the delay information of the data packet.

In a possible implementation, the determining the average user-experience information based on the source characteristic information and the packet loss information and/or the delay information of the data packet includes: determining one or more of a lost video frame, a lost video frame tile, or a lost video frame slice based on the packet loss information of the data packet and the source characteristic information; determining stalling experience information based on the one or more of a lost video frame, a lost video frame tile, or a lost video frame slice; and determining the average user-experience information based on the stalling experience information.

In the solution provided in this application, the network device may determine the one or more of a lost video frame, a lost video frame tile, or a lost video frame slice based on the packet loss information of the data packet and the source characteristic information, may further determine information such as a frame number and loss position information of the one or more of a lost video frame, a lost video frame tile, or a lost video frame slice, and may determine the average user-experience information based on the stalling experience information. Stalling experience may be for describing impact of a freezing phenomenon of all or a part of images that is caused by the one or more of a lost video frame, a lost video frame tile, or a lost video frame slice on user experience.

In a possible implementation, the determining the average user-experience information based on the source characteristic information and the packet loss information and/or the delay information of the data packet includes: determining one or more of video frame delay information, video frame tile delay information, or video frame slice delay information based on the delay information of the data packet and the source characteristic information; determining image coherence experience information and/or interaction response experience information based on the one or more of video frame delay information, video frame tile delay information, or video frame slice delay information; and determining the average user-experience information based on the image coherence experience information and/or the interaction response experience information.

In the solution provided in this application, image coherence experience may be for describing image coherence degree experience of the user for video playback, and interaction response experience may be for describing interaction response experience of the user from initiating a request to receiving a video image.

In a possible implementation, the determining the average user-experience information based on the source characteristic information and the packet loss information and/or the delay information of the data packet includes: determining one or more of a lost video frame, a lost video frame tile, or a lost video frame slice based on the packet loss information of the data packet and the source characteristic information; determining stalling experience information based on the one or more of a lost video frame, a lost video frame tile, or a lost video frame slice; determining one or more of video frame delay information, video frame tile delay information, or video frame slice delay information based on the delay information of the data packet and the source characteristic information; determining image coherence experience information and/or interaction response experience information based on the one or more of video frame delay information, video frame tile delay information, or video frame slice delay information, and determining the average user-experience information based on the stalling experience information, and the image coherence experience information and/or the interaction response experience information.

In the solution provided in this application, the average user-experience information is determined based on the stalling experience information, and the image coherence experience information and/or the interaction response experience information, so that the average user-experience information is determined more accurately, and the network design can be better guided, to send the data packet to the terminal.

In a possible implementation, the communication method may further include: obtaining feedback information from the terminal, where the feedback information indicates a status of receiving and processing the data packet by the terminal. The obtaining average user-experience information includes: determining the average user-experience information based on the source characteristic information and the feedback information.

In the solution provided in this application, the average user-experience information may be determined based on the source characteristic information and the feedback information. The network device may obtain the feedback information from the terminal, where the feedback information may include packet loss information obtained by receiving and processing the data packet by the terminal, and may further include delay information obtained by receiving and processing the data packet by the terminal. The feedback information is determined based on third delay information of the data packet and/or third reliability information of the data packet. The third delay information of the data packet and/or the third reliability information of the data packet may indicate delay information and/or reliability information, for example, on an air interface, of data transmitted from the network device to the terminal, and delay information and/or reliability information of processing the data packet after receiving the data packet by the terminal. The third delay information of the data packet and/or the third reliability information of the data packet may further indicate end-to-end delay information and/or reliability information of the data from encoding and sending of the source end to receiving and processing of the terminal.

In a possible implementation, the determining the average user-experience information based on the source characteristic information and the feedback information includes: determining one or more of a lost video frame, a lost video frame tile, or a lost video frame slice based on packet loss information in the feedback information and the source characteristic information; determining stalling experience information based on the one or more of a lost video frame, a lost video frame tile, or a lost video frame slice; and determining the average user-experience information based on the stalling experience information.

In the solution provided in this application, the network device may determine the one or more of a lost video frame, a lost video frame tile, or a lost video frame slice based on the packet loss information in the feedback information and the source characteristic information, may further determine information such as a frame number and loss position information of the one or more of a lost video frame, a lost video frame tile, or a lost video frame slice, and may determine the average user-experience information based on the stalling experience information. Stalling experience may be for describing impact of a freezing phenomenon of all or a part of images that is caused by the one or more of a lost video frame, a lost video frame tile, or a lost video frame slice on user experience.

In a possible implementation, the determining the average user-experience information based on the source characteristic information and the feedback information includes: determining one or more of video frame delay information, video frame tile delay information, or video frame slice delay information based on delay information in the feedback information and the source characteristic information;

determining image coherence experience information and/or interaction response experience information based on the one or more of video frame delay information, video frame tile delay information, or video frame slice delay information; and determining the average user-experience information based on the image coherence experience information and/or the interaction response experience information.

In the solution provided in this application, image coherence experience may be for describing image coherence degree experience of the user for video playback, and interaction response experience may be for describing interaction response experience of the user from initiating a request to receiving a video image.

In a possible implementation, the determining the average user-experience information based on the source characteristic information and the feedback information includes: determining one or more of a lost video frame, a lost video frame tile, or a lost video frame slice based on packet loss information in the feedback information and the source characteristic information; determining stalling experience information based on the one or more of a lost video frame, a lost video frame tile, or a lost video frame slice; determining one or more of video frame delay information, video frame tile delay information, or video frame slice delay information based on delay information in the feedback information and the source characteristic information; determining image coherence experience information and/or interaction response experience information based on the one or more of video frame delay information, video frame tile delay information, or video frame slice delay information; and determining the average user-experience information based on the stalling experience information, and the image coherence experience information and/or the interaction response experience information.

In the solution provided in this application, the average user-experience information is determined based on the stalling experience information, and the image coherence experience information and/or the interaction response experience information, so that the average user-experience information is determined more accurately, and the network design can be better guided, to send the data packet to the terminal.

In a possible implementation, the determining stalling experience information based on the one or more of a lost video frame, a lost video frame tile, or a lost video frame slice includes: determining stalling duration and a stalling frequency based on the one or more of a lost video frame, a lost video frame tile, or a lost video frame slice; and determining the stalling experience information based on the stalling duration and the stalling frequency.

In the solution provided in this application, the stalling experience information may be determined based on the stalling duration and the stalling frequency. The stalling duration may be for describing total stalling duration of a video in a playback process. The stalling frequency may be for describing an average number of times of stalling in unit time in a process in which the user watches a video. In this way, user experience information of the data can be reflected at a smaller granularity, so that the determined average user-experience information is more accurate.

In a possible implementation, the obtaining quality impairment information of a data packet includes: determining the quality impairment information of the data packet based on the source characteristic information.

In the solution provided in this application, the network device may determine the quality impairment information of the data packet based on the source characteristic information. The degree of the impact of the data packet loss on the experience quality of the data received by the user may be accurately determined based on the source characteristic information. For example, a position of the data packet in a frame may be known based on the source characteristic information, to determine, based on the position of the data packet, the degree of the impact of the data packet loss on the experience quality of the data received by the user.

In a possible implementation, the determining the quality impairment information of the data packet based on the source characteristic information includes: determining the quality impairment information of the data packet based on the GOP information corresponding to the data packet and the frame information corresponding to the data packet.

In the solution provided in this application, the GOP information corresponding to the data packet and the frame information corresponding to the data packet may be determined based on the source characteristic information, and the quality impairment information of the data packet is determined based on the GOP information corresponding to the data packet and the frame information corresponding to the data packet, so that the priority of the data packet can be more accurately determined, and the network design is more accurately guided.

In a possible implementation, the communication method further includes: receiving the data packet; and parsing header information of the data packet. The obtaining quality impairment information of a data packet includes: determining the quality impairment information of the data packet based on the header information.

In the solution provided in this application, the source end may determine the quality impairment information of the data packet based on the source characteristic information of the data, and store the quality impairment information of the data packet in the header information of the data packet. After the source end sends the data packet to the network device, the network device may parse the packet header information of the data packet, and determine the quality impairment information of the data packet based on the packet header information. In this way, the network device may not need to re-determine the quality impairment information of the data packet, to improve a data transmission rate.

In a possible implementation, the communication method further includes:
sending second delay information of the data packet and/or second reliability information of the data packet to the terminal.

In the solution provided in this application, when the network device processes the data packet, a delay of the data packet and/or reliability information of the data packet are affected. The second delay information of the data packet may represent delay information that is of the data packet and that corresponds when the network device sends the data packet, and the second reliability information of the data packet may represent reliability information that is of the data packet and that corresponds when the network device sends the data packet.

In a possible implementation, experience quality information includes at least one of the average user-experience information, the quality impairment information of the data packet, and the first delay information of the data packet and/or the first reliability information of the data packet.

In the solution provided in this application, there may be a correspondence between a value range of the experience quality information and a quality impairment prediction, average user-experience of a service, and/or network transmission quality of the data. The average user-experience of the service may be assessed, for example, based on one or more of the following indicators: image definition, image smoothness, image distortion, an image stereoscopic sensation, an image black edge, image smearing, sound quality, a sound effect, a field of view; stalling sensation, artifact sensation, dizziness sensation, audio/video synchronization, interaction freedom, interaction operation response speed, interaction operation accuracy, or content loading speed. In this manner, subjective user experience of the data and objective impact of the network transmission on the data can be better reflected by using the experience quality information, so that the operator can be guided to perform more targeted optimization on the network transmission of the data based on user experience and the impact of the network transmission.

In a possible implementation, experience quality information includes the average user-experience information, the quality impairment information of the data packet, delay information of the data packet, and/or reliability information of the data packet. The experience quality information is determined based on at least one of the average user-experience information, the quality impairment information of the data packet, and the first delay information of the data packet and/or the first reliability information of the data packet. In the solution provided in this application, the experience quality information may be determined based on at least one of the average user-experience information, the quality impairment information of the data packet, and the first delay information of the data packet and/or the first reliability information of the data packet. In this way, impact on the data in a transmission process can be determined in different dimensions, so that the data is visible and controllable in the network transmission. In this way, the objective impact on the data in the network transmission can be systematically assessed, the network design is guided, and the network operator is guided to perform network maintenance and optimization based on the requirement of the data.

According to a second aspect, this application provides a communication method. The communication method may be performed by a terminal (for example, an XR terminal), or may be performed by a chip, a chip system, a processor, or the like that supports the terminal in implementing the method. The following provides descriptions by using an example in which the communication method is performed by the terminal. The communication method may be for determining transmission of XR data, and may include: obtaining a priority of a data packet; and receiving the data packet from a network device based on the priority of the data packet, where the priority of the data packet is related to quality impairment information of the data packet and/or average user-experience information.

In the solution provided in this application, the terminal may obtain the priority of the data packet, and then receive the data packet from the network device based on the priority of the data packet. The priority of the data packet is related to the quality impairment information of the data packet and/or the average user-experience information. The quality impairment information of the data packet may indicate a degree of impact of a data packet loss on experience quality of data received by a user. The average user-experience information may indicate average experience quality of data received by the user within a period of time. Therefore, according to the method, objective impact on data in network transmission can be systematically assessed. The data packet from the network device is received based on the priority of the data packet, so that an experience requirement of the user on the data can be satisfied.

It may be understood that the second aspect is performed by the terminal, and specific content of the second aspect corresponds to content of the first aspect. For corresponding features of the second aspect and beneficial effects achieved, refer to descriptions of the first aspect. To avoid repetition, detailed descriptions are appropriately omitted herein.

In a possible implementation, the priority of the data packet is further related to first delay information of the data packet and/or first reliability information of the data packet.

In a possible implementation, the priority of the data packet, the quality impairment information of the data packet, the average user-experience information, and the first delay information of the data packet and/or the first reliability information of the data packet satisfy:

$$F=\alpha*f1+\beta*f2+\gamma*f3;$$

$$F=\alpha*f1+\beta*f2+\delta*f4; \text{ or}$$

$$F=\alpha*f1+\beta+f2+\gamma*f3+\delta+f4$$

where $\alpha$, $\beta$, $\gamma$, and $\delta$ are coefficients greater than 0, F represents a value corresponding to the priority of the data packet, $f1$ represents a value corresponding to the quality impairment information of the data packet, $f2$ represents a value corresponding to the average user-experience information, $f3$ represents a value corresponding to the first delay information of the data packet, and $f4$ represents a value corresponding to the first reliability information of the data packet.

In a possible implementation, the communication method further includes: receiving second delay information of the data packet and/or second reliability information of the data packet from the network device; determining third delay information of the data packet and/or third reliability information of the data packet based on the second delay information of the data packet and/or the second reliability information of the data packet, and determining feedback information of the data packet based on the third delay information of the data packet and/or the third reliability information of the data packet, where the feedback information indicates a status of receiving and processing the data packet by a terminal, and the feedback information includes packet loss information of the data packet and/or delay information of the data packet; and sending the feedback information to the network device based on the priority of the data packet.

In the solution provided in this application, the terminal receives the second delay information of the data packet and/or the second reliability information of the data packet from the network device. The second delay information of the data packet and/or the second reliability information of the data packet may indicate delay information and/or reliability information that are/is of the data packet and that correspond/corresponds when the network device sends the data packet. The third delay information of the data packet and/or the third reliability information of the data packet may indicate delay information of the data packet and/or reliability information of the data packet that are/is after the terminal receives and processes the data packet. In this way, the network device may obtain, based on the feedback information, packet loss information and delay information of the data packet that are after the terminal receives and processes the data packet.

According to a third aspect, this application provides a communication apparatus. The communication apparatus may be a network device (for example, a core network device, an access network device, a Wi-Fi router, or a Wi-Fi access point), or may be a chip, a chip system, a processor, or the like that supports the network device. The communication apparatus may include:

an obtaining unit, configured to obtain average user-experience information, where the obtaining unit is further configured to obtain quality impairment information of a data packet; and a sending unit, configured to send the data packet to a terminal based on a priority of the data packet, where the priority of the data packet is related to the quality impairment information of the data packet and/or the average user-experience information.

In a possible implementation, the obtaining unit is further configured to:

obtain first delay information of the data packet and/or first reliability information of the data packet, where the priority of the data packet is further related to the first delay information of the data packet and/or the first reliability information of the data packet.

In a possible implementation, the priority of the data packet, the quality impairment information of the data packet, the average user-experience information, and the first delay information of the data packet and/or the first reliability information of the data packet satisfy:

$$F=\alpha*f1+\beta*f2+\gamma*f3;$$

$$F=\alpha*f1+\beta*f2+\delta*f4; \text{ or}$$

$$F=\alpha*f1+\beta+f2+\gamma*f3+\delta+f4$$

where $\alpha$, $\beta$, $\gamma$, and $\delta$ are coefficients greater than 0, F represents a value corresponding to the priority of the data packet, $f1$ represents a value corresponding to the quality impairment information of the data packet, $f2$ represents a value corresponding to the average user-experience information, $f3$ represents a value corresponding to the first delay information of the data packet, and $f4$ represents a value corresponding to the first reliability information of the data packet.

In a possible implementation, the obtaining unit is further configured to obtain source characteristic information of the data packet.

In a possible implementation, the source characteristic information includes group of pictures GOP information corresponding to the data packet and frame information corresponding to the data packet.

In a possible implementation, the obtaining unit is further configured to:

obtain packet loss information and/or delay information of the data packet.

That the obtaining unit obtains the average user-experience information includes: determining the average user-experience information based on the source characteristic information and the packet loss information and/or the delay information of the data packet.

In a possible implementation, that the obtaining unit determines the average user-experience information based on the source characteristic information and the packet loss information and/or the delay information of the data packet includes:

determining one or more of a lost video frame, a lost video frame tile, or a lost video frame slice based on the packet loss information of the data packet and the source characteristic information; determining stalling experience information based on the one or more of a lost video frame, a lost video frame tile, or a lost video frame slice; and determining the average user-experience information based on the stalling experience information.

In a possible implementation, that the obtaining unit determines the average user-experience information based on the source characteristic information and the packet loss information and/or the delay information of the data packet includes:

determining one or more of video frame delay information, video frame tile delay information, or video frame slice delay information based on the delay information of the data packet and the source characteristic information; determining image coherence experience information and/or interaction response experience information based on the one or more of video frame delay information, video frame tile delay information, or video frame slice delay information; and determining the average user-experience information based on the image coherence experience information and/or the interaction response experience information.

In a possible implementation, that the obtaining unit determines the average user-experience information based on the source characteristic information and the packet loss information and/or the delay information of the data packet includes:

determining one or more of a lost video frame, a lost video frame tile, or a lost video frame slice based on the packet loss information of the data packet and the source characteristic information; determining stalling experience information based on the one or more of a lost video frame, a lost video frame tile, or a lost video frame slice; determining one or more of video frame delay information, video frame tile delay information, or video frame slice delay information based on the delay information of the data packet and the source characteristic information; determining image coherence experience information and/or interaction response experience information based on the one or more of video frame delay information, video frame tile delay information, or video frame slice delay information; and determining the average user-experience information based on the stalling experience information, and the image coherence experience information and/or the interaction response experience information.

In a possible implementation, the obtaining unit is further configured to:

obtain feedback information from the terminal, where the feedback information indicates a status of receiving and processing the data packet by the terminal.

That the obtaining unit obtains the average user-experience information includes: determining the average user-experience information based on the source characteristic information and the feedback information.

In a possible implementation, that the obtaining unit determines the average user-experience information based on the source characteristic information and the feedback information includes:

determining one or more of a lost video frame, a lost video frame tile, or a lost video frame slice based on packet loss information in the feedback information and the source characteristic information; determining stalling experience information based on the one or more of a lost video frame, a lost video frame tile, or a lost video frame slice; and determining the average user-experience information based on the stalling experience information.

In a possible implementation, that the obtaining unit determines the average user-experience information based on the source characteristic information and the feedback information includes:

determining one or more of video frame delay information, video frame tile delay information, or video frame slice delay information based on delay information in the feedback information and the source characteristic information; determining image coherence experience information and/or interaction response experience information based on the one or more of video frame delay information, video frame tile delay information, or video frame slice delay information; and determining the average user-experience information based on the image coherence experience information and/or the interaction response experience information.

In a possible implementation, that the obtaining unit determines the average user-experience information based on the source characteristic information and the feedback information includes:

determining one or more of a lost video frame, a lost video frame tile, or a lost video frame slice based on packet loss information in the feedback information and the source characteristic information; determining stalling experience information based on the one or more of a lost video frame, a lost video frame tile, or a lost video frame slice; determining one or more of video frame delay information, video frame tile delay information, or video frame slice delay information based on delay information in the feedback information and the source characteristic information; determining image coherence experience information and/or interaction response experience information based on the one or more of video frame delay information, video frame tile delay information, or video frame slice delay information; and determining the average user-experience information based on the stalling experience information, and the image coherence experience information and/or the interaction response experience information.

In a possible implementation, that the obtaining unit determines the stalling experience information based on the one or more of a lost video frame, a lost video frame tile, or a lost video frame slice includes: determining stalling duration and a stalling frequency based on the one or more of a lost video frame, a lost video frame tile, or a lost video frame slice; and determining the stalling experience information based on the stalling duration and the stalling frequency.

In a possible implementation, that the obtaining unit obtains the quality impairment information of the data packet includes:

determining the quality impairment information of the data packet based on the source characteristic information.

In a possible implementation, that the obtaining unit determines the quality impairment information of the data packet based on the source characteristic information includes:

determining the quality impairment information of the data packet based on the GOP information corresponding to the data packet and the frame information corresponding to the data packet.

In a possible implementation, the communication apparatus further includes:

a receiving unit, configured to receive the data packet; and a parsing unit, configured to parse header information of the data packet. That the obtaining unit obtains the quality impairment information of the data packet includes: determining the quality impairment information of the data packet based on the header information.

In a possible implementation, the sending unit is further configured to send second delay information of the data packet and/or second reliability information of the data packet to the terminal.

In a possible implementation, experience quality information includes at least one of the average user-experience information, the quality impairment information of the data packet, and the first delay information of the data packet and/or the first reliability information of the data packet.

In a possible implementation, experience quality information includes the average user-experience information, the quality impairment information of the data packet, delay information of the data packet, and/or reliability information of the data packet.

The obtaining unit determines the experience quality information based on at least one of the average user-experience information, the quality impairment information of the data packet, and the first delay information of the data packet and/or the first reliability information of the data packet.

According to a fourth aspect, this application provides a communication apparatus. The communication apparatus may be a terminal (for example, an XR terminal), or may be a chip, a chip system, a processor, or the like that supports the terminal. The communication apparatus may include:

an obtaining unit, configured to obtain a priority of a data packet; and a receiving unit, configured to receive the data packet from a network device based on the priority of the data packet, where the priority of the data packet is related to quality impairment information of the data packet and/or average user-experience information.

In a possible implementation, the priority of the data packet is further related to first delay information of the data packet and/or first reliability information of the data packet.

In a possible implementation, the priority of the data packet, the quality impairment information of the data packet, the average user-experience information, and the first delay information of the data packet and/or the first reliability information of the data packet satisfy:

$$F=\alpha*f1+\beta*f2+\gamma*f3;$$

$$F=\alpha*f1+\beta*f2+\delta*f4; \text{ or}$$

$$F=\alpha*f1+\beta+f2+\gamma*f3+\delta+f4$$

where $\alpha$, $\beta$, $\gamma$, and $\delta$ are coefficients greater than 0, F represents a value corresponding to the priority of the data packet, $f1$ represents a value corresponding to the quality impairment information of the data packet, $f2$ represents a value corresponding to the average user-experience information, $f3$ represents a value corresponding to the first delay information of the data packet, and $f4$ represents a value corresponding to the first reliability information of the data packet.

In a possible implementation, the receiving unit is further configured to:

receive second delay information and second reliability information of the data packet from the network device.

The communication apparatus further includes:
a determining unit, configured to determine third delay information and third reliability information of the data packet based on the second delay information and the second reliability information of the data packet, and determine feedback information of the data packet based on the third delay information and the third reliability information of the data packet, where the feedback information indicates a status of receiving and processing the data packet by a terminal, and the feedback information includes packet loss information and delay information of the data packet; and
a sending unit, configured to send the feedback information to the network device based on the priority of the data packet.

According to a fifth aspect, this application provides a communication apparatus. The communication apparatus may be a network device (for example, a core network device, an access network device, a Wi-Fi router, or a Wi-Fi access point), or may be a chip, a chip system, a processor, or the like that supports the network device. The communication apparatus may include a processor. The processor is coupled to a memory. The memory is configured to store a program or instructions. When the program or the instructions are executed by the processor, the apparatus is enabled to implement the communication method according to any one of the first aspect or the possible implementations of the first aspect.

According to a sixth aspect, this application provides a communication apparatus. The communication apparatus may be a terminal (for example, an XR terminal), or may be a chip, a chip system, a processor, or the like that supports the terminal. The communication apparatus may include a processor. The processor is coupled to a memory. The memory is configured to store a program or instructions. When the program or the instructions are executed by the processor, the apparatus is enabled to implement the communication method according to any one of the second aspect or the possible implementations of the second aspect.

According to a seventh aspect, this application provides a computer-readable storage medium. The computer-readable storage medium stores a computer program or computer instructions. When the computer program or the computer instructions are run, some or all of steps of the communication methods in the first aspect, any possible implementation of the first aspect, the second aspect, and any possible implementation of the second aspect are enabled to be performed.

According to an eighth aspect, this application provides a computer program product including executable instructions. When the computer program product runs on user equipment, some or all of steps of the communication methods in the first aspect, any possible implementation of the first aspect, the second aspect, and any possible implementation of the second aspect are enabled to be performed.

According to a ninth aspect, this application provides a chip system. The chip system includes at least one processor, at least one memory, and at least one interface circuit. The memory, the interface circuit, and the at least one processor are connected to each other through a line. The at least one memory stores instructions. When the instructions are executed by the processor, the chip system is enabled to perform some or all of steps of the communication methods in the first aspect, any possible implementation of the first aspect, the second aspect, and any possible implementation of the second aspect.

According to a tenth aspect, this application provides a communication system. The communication system includes the communication apparatus according to the fifth aspect and the communication apparatus according to the sixth aspect.

DESCRIPTION OF EMBODIMENTS

Figure 1:
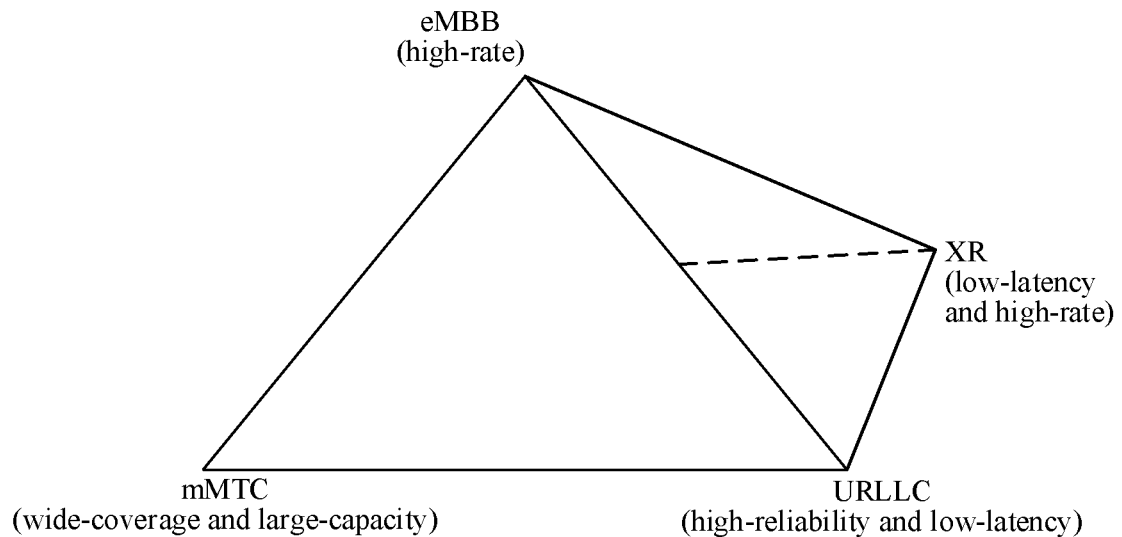
FIG. 1 is a schematic diagram of four service requirements according to an embodiment of this application.

For ease of understanding of this application, related technological knowledge in embodiments of this application is first described herein.

1. Mean Opinion Score (MOS)

The MOS is a subjective quantification method for assessing voice quality. The MOS can reflect subjective perception of a user on the voice quality. For example, a possible 5-point MOS is shown in the following Table 1.

TABLE 1

| Voice quality | MOS |
|---|---|
| Excellent | 5 |
| Good | 4 |
| Accept | 3 |
| Poor | 2 |
| Bad | 1 |

2. Video Multimethod Assessment Fusion (VMAF)

Through VMAF (which may also be referred to as video multidimensional assessment fusion), multidimensional indicators (for example, a distortion degree and a distortion type) related to a video source may be fused, and an assessment of video quality is obtained through machine learning or by using an artificial intelligence algorithm. Through VMAF, a specific weighted value may be allocated to an indicator in the multidimensional indicators to reflect advantage gravity of the indicator in a final assessment. In this way, a more accurate assessment score can be obtained.

An XR technology has advantages such as multi-view and strong interactivity, can provide brand new experience for a user, and has a great application value and business potential. XR includes technologies such as VR, AR, and MR, and can be widely applied to many fields such as entertainment, gaming, medical care, advertising, industry, online education, and engineering. The VR technology mainly means rendering of visual and audio scenarios to simulate sensory stimulation of vision and audio in a real world to the user as much as possible. The user is usually required to wear an XR terminal (for example, a head wearable device) to simulate the vision and/or audition for the user. The VR technology may further perform action tracking on the user, to update content of the simulated visual and/or audition in time. The AR technology mainly means providing visual and/or auditory additional information or manually generated content in a real environment sensed by the user. The user may obtain the real environment directly (for example, without sensing, processing, and rendering) or indirectly (where for example, the real environment is transferred in a manner such as through a sensor), and perform further enhancement processing. The MR technology is inserting some virtual elements into a physical scenario, to provide the user with immersive experience in which the elements are a part of a real scenario. A network device may process and transmit data (which may be referred to as XR data) generated by an XR service. For example, a source end may render and encode (for example, perform source encoding on) source data of XR, and transmit the XR data to an XR terminal via a network device in a core network and/or a network device in an access network. The XR terminal provides the user with diversified XR experience (for example, immersive experience, visual experience, interaction experience, or device experience) by processing the XR data. The XR experience has a plurality of different assessment dimensions, for example, includes one or more of the following assessment dimensions: image definition, image smoothness, image distortion, an image stereoscopic sensation, an image black edge, image smearing, sound quality, a sound effect, a field of view, stalling sensation, artifact sensation, dizziness sensation, audio/video synchronization, interaction freedom, interaction operation response speed, interaction operation accuracy, exchange content loading speed, terminal wear comfort, terminal wear fatigue, terminal endurance, terminal portability, terminal visual impairment friendliness, or the like.

The data of the XR service includes one or more of VR data, AR data, MR data, video data, audio data, or picture data. A data transmission requirement of the XR service is different from data transmission requirements of an enhanced mobile broadband (eMBB) service, a massive machine type communication (mMTC) service, and an ultra-reliable and low-latency communication (URLLC) service. FIG. 1 is a schematic diagram of four service requirements according to an embodiment of this application. As shown in FIG. 1, the schematic diagram may include a triangular pyramid. Four vertices of the triangular pyramid represent data transmission requirement focuses of an eMBB service, an mMTC service, a URLLC service, and an XR service, and different vertices represent different data transmission requirement focuses of different services. The XR service may alternatively be considered as a fourth-type service in a post-5th generation mobile network (5G) or 6th generation mobile network (6G) communication system, which may be referred to as a fourth-level service for short. The eMBB service has a high requirement on a data rate, the mMTC service has a high requirement on coverage and a capacity, and the URLLC service has a high requirement on a delay and reliability. The XR service has requirements of a low delay and a high rate, and measuring whether a requirement of the XR service is satisfied usually depends on user experience. For example, when the XR data is transmitted with a long delay or at a low rate, the user may have dizziness in viewing, resulting in poor visual experience of the user.

XR data experience quality is usually assessed in two manners: a subjective assessment manner and an objective assessment manner. The subjective assessment manner is a manner in which an expert is invited to perform scoring through the mean opinion score MOS. A quality score that truly reflects human subjective experience can be obtained through the MOS, but implementation is quite difficult in a live network. The objective assessment manner includes manners such as the VMAF, a peak signal-to-noise ratio (PSNR), structural similarity (SSIM), and video quality metric (VQM). The VMAF is assessment that is based on the machine learning, is closer to human subjective perception (the MOS) than a conventional indicator, and is the most recognized objective assessment standard of the video quality in the industry currently. A feature of the VMAF is that the video source needs to be known, and an assessment score value of the video source in a 100-point system is calculated by using a VMAF open-source code algorithm. The current VMAF is highly fit with a subjective score of the expert (a DMOS). This indicates that an objective calculation and assessment method such as the VMAF is accurate. Through the PSNR, the SSIM, and the VQM, related information, for example, pixel information and feature statistics information of a received video and an original video is compared to obtain a video score. Usually, information, for example, the VMAF, the PSNR, the SSIM, and the VQM, required for the assessment of the XR experience quality may not be obtained from a network device, and the assessment cannot be implemented on the network device. That is, quality of the network device cannot be visible and controllable, and optimal experience of the XR service cannot be achieved.

Figure 2:
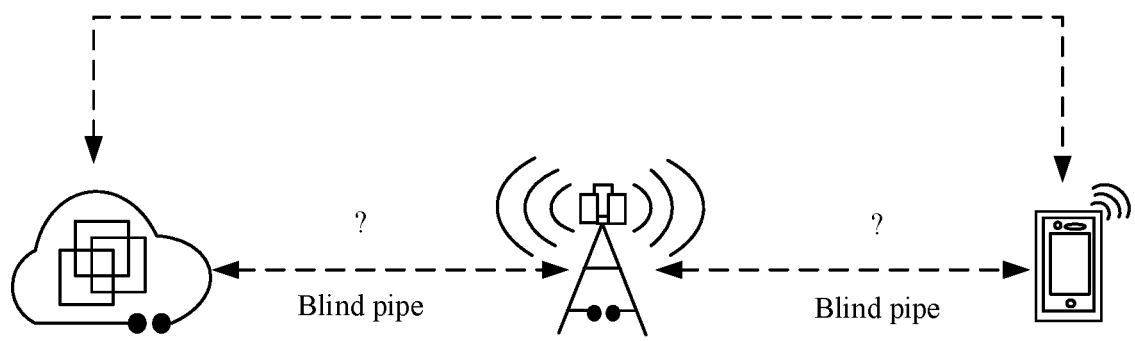
FIG. 2 is a schematic diagram of a data transmission mode according to an embodiment of this application.

FIG. 2 is a schematic diagram of a data transmission mode according to an embodiment of this application. As shown in FIG. 2, for an XR service, in an end-to-end transmission architecture, transmission scheduling is performed by using a blind pipe when XR data is transmitted, and a throughput or a system rate is usually used as a transmission target, so that an end-to-end XR service experience quality result is visible. The pipe may be understood as a wired communication pipe, namely, a routing node or a core network unit, between a source end and a base station, or may be understood as a wireless communication channel between the base station and a terminal. For example, the routing node, the core network unit, or the like between the source end and the base station may be for blind transmission of the XR data, to perform route selection and congestion control to maximize the throughput. Likewise, the transmission pipe between the base station and the terminal may be for blind transmission of the XR data, to perform transmission and resource scheduling to maximize the throughput. However, for the XR service, user experience quality is concerned, and a high throughput does not mean high experience quality. In addition, compared with a conventional mobile broadband service, the XR service allows a packet loss to some extent when user experience is ensured. XR experience quality is usually invisible in pipe transmission. For example, importance corresponding to a data packet in an XR data frame is invisible in a transmission process. Optimal experience cannot be implemented for the XR service. Pipe transmission optimization and network optimization cannot be enabled for the XR service. In addition, service fault locating and demarcation are quite difficult. Operations and maintenance costs are high.

Based on the foregoing problem, this application provides a communication method, so that impact on XR data in network transmission can be objectively measured, to optimize transmission of the XR data.

In embodiments of this application, a network device may obtain some source end information, so that experience quality information is visible and controllable in an end-to-end transmission pipe. The network device further guides routing, congestion control, transmission, and scheduling policies of different data packets for different users based on the visible quality information. Specifically, the source end information may include source characteristic information of data. The network device may determine the experience quality information of the data based on at least one of the source characteristic information of the data, first delay information of a data packet and/or first reliability information of the data packet, and user feedback information. The experience quality information may indicate data transmission quality, then a priority of the data packet is determined based on the experience quality information, and the data packet is sent to a terminal based on the priority of the data packet. In this way, objective impact on the data in network transmission can be objectively measured, to determine data transmission, and guide a network operator to perform network maintenance and optimization based on a requirement of the data.

To better understand the communication method, an apparatus, and a computer-readable storage medium that are provided in embodiments of this application, the following first describes a network architecture in embodiments of this application.

Specific embodiments are used below to describe in detail the technical solutions in this application with reference to the accompanying drawings. The following embodiments and implementations may be combined with each other, and a same or similar concept or process may not be described repeatedly in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may alternatively be implemented in a computer processor and a memory coupled to the processor.

Figure 3:
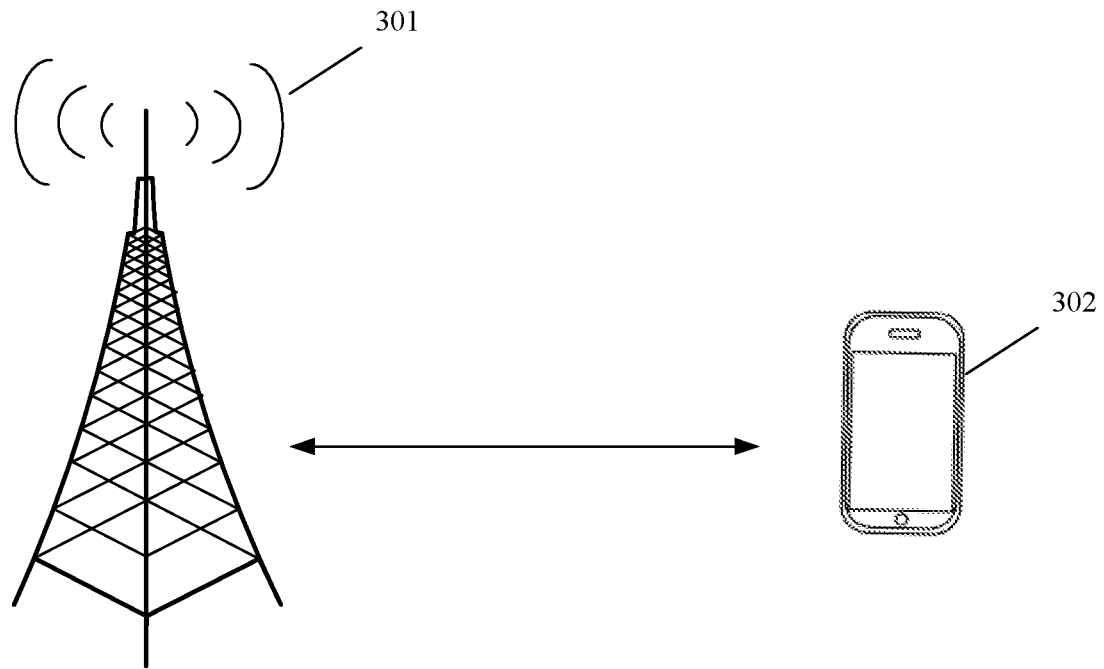
FIG. 3 is a schematic diagram of a network architecture according to an embodiment of this application.

FIG. 3 is a schematic diagram of a network architecture according to an embodiment of this application. As shown in FIG. 3, the network architecture may include a network device 301 and a terminal 302. The network device 301 may communicate with the terminal 302. The network architecture may include one or more network devices 301 and one or more terminals 302 that communicate with the one or more network devices 301. It may be understood that the network device 301 and the terminal 302 may also be referred to as communication devices.

Figure 4:
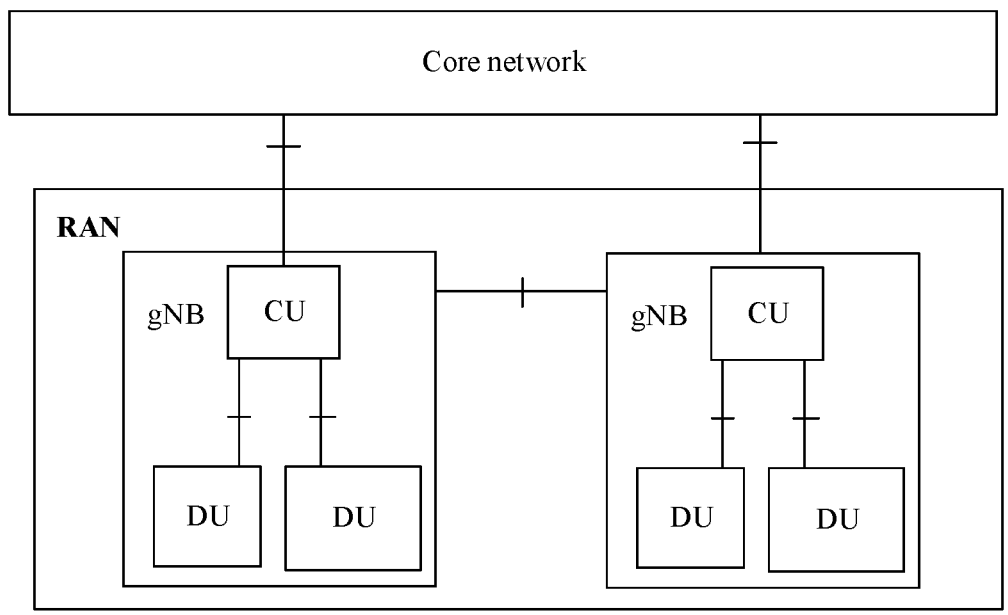
FIG. 4 is a schematic diagram of another network architecture according to an embodiment of this application.

FIG. 4 is a schematic diagram of another network architecture according to an embodiment of this application. As shown in FIG. 4, the network architecture may include a radio access network (RAN) and a core network. The RAN may be connected to the core network (where for example, the core network may be a long term evolution (LTE) core network, or may be a 5G core network). A network device in the RAN may include a base station (for example, a gNodeB or a gNB) of an architecture in which a central unit (CU) and a distributed unit (DU) are separated. The CU and the DU may be understood as division of the base station from the perspective of logical functions. The CU and the DU may be physically separated or deployed together. A plurality of DUs may share one CU. Alternatively, one DU may be connected to a plurality of CUs (not shown in the figure). The CU and the DU may be connected through an interface, for example, an F1 interface. The CU and the DU may be obtained through division based on protocol layers of a wireless network. For example, functions of a packet data convergence protocol (PDCP) layer and a radio resource control (RRC) layer are disposed on the CU, and functions of a radio link control (RLC) layer, a media access control (MAC) layer, and a physical layer are disposed on the DU. It may be understood that division into processing functions of the CU and the DU based on the protocol layers is merely an example, and there may be another division manner. For example, the CU or the DU may have functions of more protocol layers through division. For example, the CU or the DU may alternatively have some processing functions of a protocol layer through division. In a design, some functions of the RLC layer and functions of a protocol layer above the RLC layer are disposed on the CU, and remaining functions of the RLC layer and functions of a protocol layer below the RLC layer are disposed on the DU. In another design, functions of the CU or the DU may alternatively be obtained through division based on a service type or another system requirement. For example, division is performed based on a delay, a function whose processing time needs to satisfy a delay requirement is disposed on the DU, and a function whose processing time does not need to satisfy the delay requirement is disposed on the CU. The network architecture shown in FIG. 4 may be applied to a 5G communication system, or may share one or more components or resources with an LTE system. In another design, the CU may alternatively have one or more functions of the core network. One or more CUs may be disposed together or separately. For example, the CU may be disposed on the network device to facilitate centralized management. The DU may have a plurality of radio frequency functions, or the radio frequency functions may be disposed remotely.

The function of the CU may be implemented by one entity, or may further separate a control plane (CP) from a user plane (UP). To be specific, the control plane of the CU (CU-CP) and the user plane of the CU (CU-UP) may be implemented by different function entities, and the CU-CP and the CU-UP may be coupled to the DU to jointly implement a function of the base station.

It may be understood that embodiments provided in this application are also applicable to an architecture in which the CU and the DU are not separated.

The technologies described in embodiments of this application may be applied to various communication systems, for example, a 4th generation (4G) communication system, a 4.5G communication system, a 5G communication system, a system integrating a plurality of communication systems, or a future evolved communication system (for example, a 6G communication system), for example, an LTE system, a new radio (NR) system, a wireless-fidelity (Wi-Fi) system, a wireless self-organizing system, a direct device connection communication system, a communication system related to the 3rd generation partnership project (3GPP), and another communication system of this type.

In this application, the network device may be any device with a wireless transceiver function, and includes but is not limited to: an evolved NodeB (NodeB or eNB or eNodeB)

in LTE, a gNodeB (or gNB) or a transmission reception point (TRP) in NR, a base station that subsequently evolves in 3GPP, an access node in a Wi-Fi system, a wireless relay node, a wireless backhaul node, a core network device, or the like. The base station may be a macro base station, a micro base station, a picocell base station, a small cell, a relay station, a balloon station, or the like. A plurality of base stations may support the foregoing networks for which a same technology is used, or may support the foregoing networks for which different technologies are used. The base station may include one or more co-site or non-co-site TRPs. Alternatively, the network device may be a server (for example, a cloud server), a radio controller in a cloud radio access network (CRAN) scenario, a CU, and/or a DU. Alternatively, the network device may be a server, a wearable device, a machine communication device, a vehicle-mounted device, a smart screen, or the like. That the network device is a base station is used as an example for description below. The plurality of network devices may be base stations of a same type, or may be base stations of different types. The base station may communicate with a terminal, or may communicate with the terminal through a relay station. The terminal may communicate with a plurality of base stations for which different technologies are used. For example, the terminal may communicate with a base station supporting an LTE network, may communicate with a base station supporting a 5G network, or may support dual connections to the base station in the LTE network and the base station in the 5G network.

The terminal is a device having a wireless transceiver function, and may be deployed on land and includes an indoor or outdoor device, a handheld device, a wearable device, or a vehicle-mounted device, may be deployed on water (for example, a ship), or may be deployed in the air (for example, an airplane, a balloon, and a satellite). The terminal may be a mobile phone, a tablet (Pad), a computer with a wireless transceiver function, a VR terminal device, an AR terminal device, an MR terminal device, a terminal in industrial control, a vehicle-mounted terminal device, a terminal in self driving, a terminal in assisted driving, a terminal in telemedicine, a terminal in a smart grid, a terminal in transportation safety, a terminal in a smart city, a terminal in a smart home, and the like. An application scenario is not limited in embodiments of this application. The terminal may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a wireless communication device, a machine terminal, a UE proxy, a UE apparatus, or the like. The terminal may be fixed or mobile.

By way of example but not limitation, in this application, the terminal may be a wearable device. The wearable device may also be referred to as a wearable intelligent device, and is a generic name of wearable devices developed by intelligently designing daily wear by using a wearable technology, for example, glasses, gloves, a watch, clothing, and shoes. The wearable device is a portable device that can be directly worn or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus only on one type of application function and need to work with other devices such as smartphones, for example, various smart bands or smart jewelry for monitoring physical signs.

In this application, the terminal may be a terminal in an internet of things (IoT) system. An IoT is an important component of future information technology development. A main technical feature of the IoT is connecting an object to a network by using a communication technology, to implement an intelligent network of human-machine interconnection and thing-thing interconnection. The terminal in this application may be a terminal in machine type communication (MTC). The terminal in this application may be an in-vehicle module, an onboard component, an automotive chip, or an on board unit that is built in a vehicle as one or more components or units. The vehicle may implement the method in this application by using the in-vehicle module, the onboard component, the automotive chip, or the on board unit that is built in the vehicle. Therefore, embodiments of this application may be applied to an internet of vehicles, for example, vehicle to everything (V2X), long term evolution-vehicle (LTE-V), and vehicle to vehicle (V2V).

The terminal in this application may alternatively be a VR terminal, an AR terminal, or an MR terminal. The VR terminal, the AR terminal, and the MR terminal each may be referred to as an XR terminal. For example, the XR terminal may be a head wearable device (for example, a helmet or glasses), may be an all-in-one machine, or may be a television, a display, a car, a vehicle-mounted device, a tablet, or a smart screen. The XR terminal can present XR data to the user, and the user can experience diversified XR services by wearing or using the XR terminal. The XR terminal may access the network in a wireless or wired manner, for example, via Wi-Fi or a 5G system.

Figure 5:
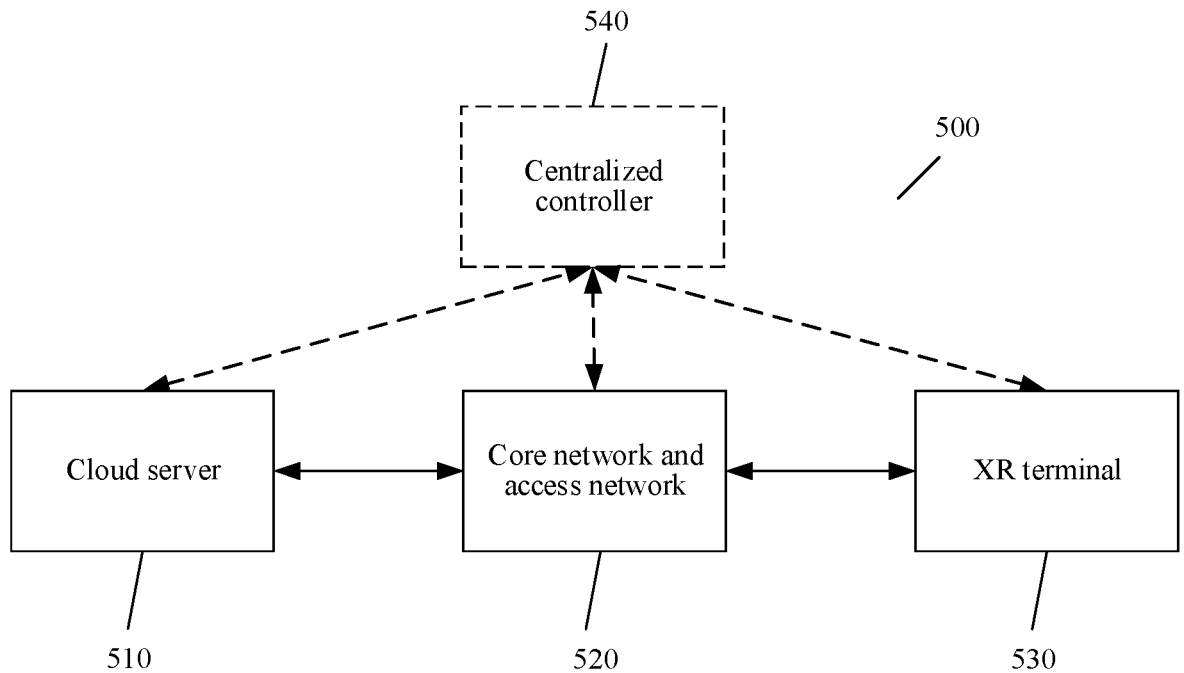
FIG. 5 to FIG. 7 are schematic diagrams of several system network elements according to embodiments of this application.
Figure 6:
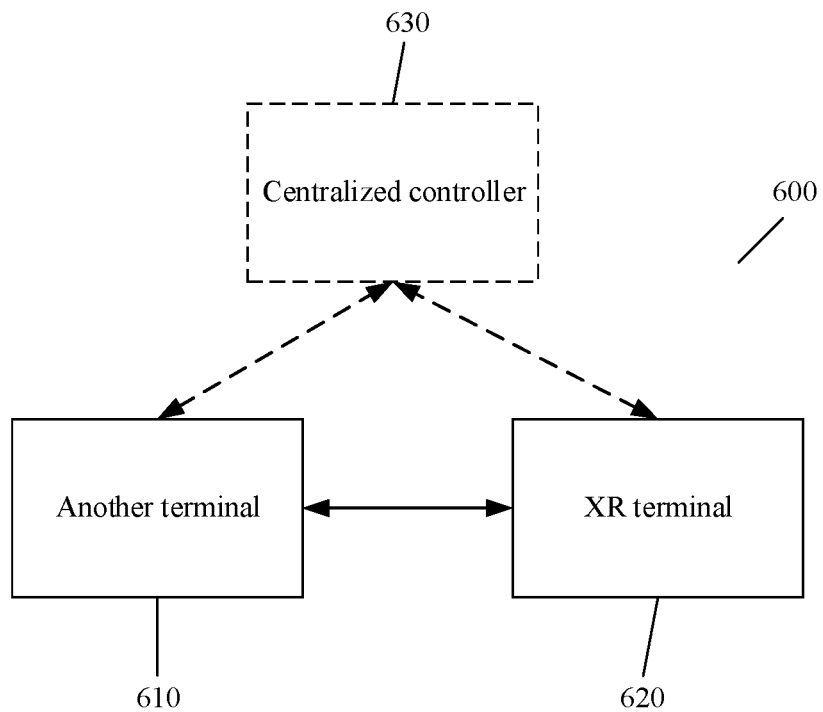
Figure 7:
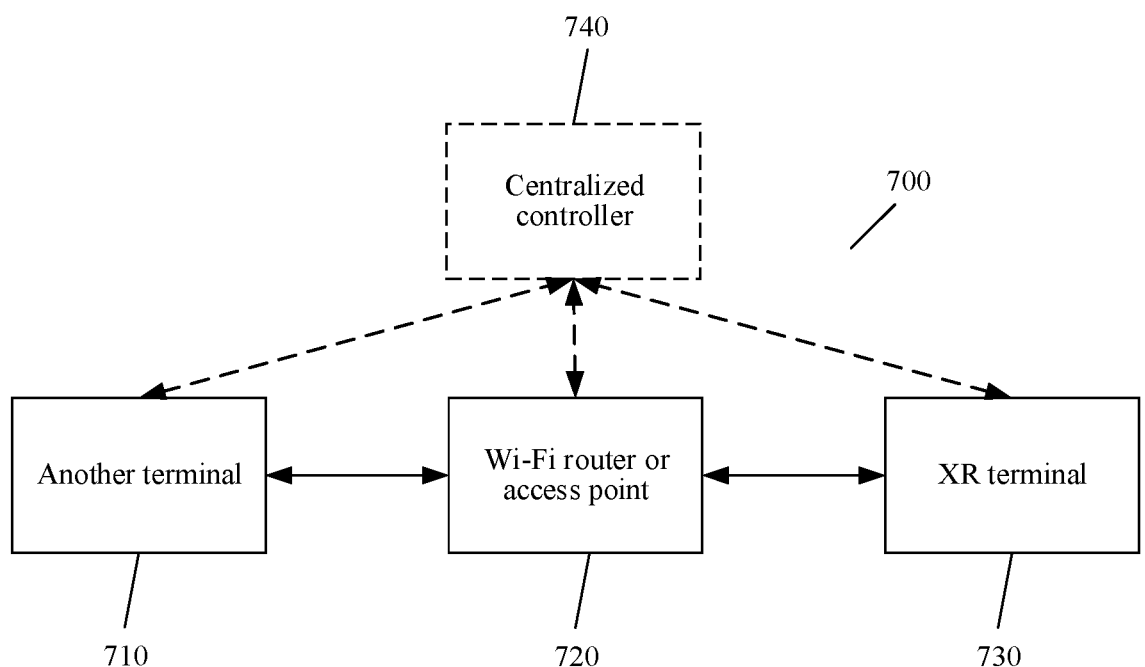

Embodiments provided in this application are applicable to a plurality of different scenarios. FIG. 5 to FIG. 7 are schematic diagrams of several system frameworks to which embodiments of this application are applicable.

FIG. 5 is a schematic diagram of a system network element according to an embodiment of this application. FIG. 5 shows a system 500, including a cloud server 510, a core network and an access network 520 (which may be referred to as a transmission network 520) for short, for example, an LTE, 5G, or 6G network), and an XR terminal 530. The cloud server 510 may be configured to render, encode, and decode source data of XR, the transmission network 520 may be for transmitting XR data, and the XR terminal 530) provides diversified XR experience for a user by processing the XR data. It may be understood that another apparatus may be further included between the transmission network 520 and the XR terminal 530. For example, another terminal (for example, a mobile phone, a notebook computer, or a car) and/or a network device (for example, a relay, a Wi-Fi router, or a Wi-Fi access point) may be further included. The XR terminal 530 obtains the XR data from the transmission network 520 via the another terminal and/or the network device. Optionally, the system 500 further includes a centralized controller 540. The centralized controller 540) may receive/collect data from one or more of the cloud server 510, the transmission network 520, or the XR terminal 530, or may send data to one or more of the cloud server 510, the transmission network 520, or the XR terminal 530. It may be understood that the centralized controller 540) may be deployed independently of the cloud server 510, the transmission network 520, and the XR terminal 530, or may be deployed in the cloud server 510, the transmission network 520, or the XR terminal 530.

Alternatively, the centralized controller 540) may not be deployed, and a function of the centralized controller 540 is implemented by the cloud server 510, the transmission network 520, or the XR terminal 530.

FIG. 6 is a schematic diagram of another system network element according to an embodiment of this application. FIG. 6 shows a system 600, including an XR terminal 620 and another terminal 610. The another terminal 610 is a terminal other than the XR terminal 620. The another terminal 610 may be an XR terminal, or may be a common terminal (which may also be referred to as a non-XR terminal). The another terminal 610 may transmit XR data to the XR terminal 620. Optionally, the system 600 further includes a centralized controller 630. The centralized controller 630 may receive/collect data from the XR terminal 620 and/or the another terminal 610, or may send data to the XR terminal 620 and/or the another terminal 610. It may be understood that the centralized controller 630 may be deployed independently of the XR terminal 620 and the another terminal 610, or may be deployed in the XR terminal 620 or the another terminal 610. Alternatively, the centralized controller 630 may not be deployed, and a function of the centralized controller 630 is implemented by the XR terminal 620 or the another terminal 610.

FIG. 7 is a schematic diagram of still another system network element according to an embodiment of this application. FIG. 7 shows a system 700, including an XR terminal 730, a Wi-Fi router or a Wi-Fi access point 720 (which may be referred to as a Wi-Fi apparatus 720) for short), and another terminal 710. The another terminal 710 is a terminal other than the XR terminal 730, and the another terminal 710 may be an XR terminal, or may be a common terminal (which may also be referred to as a non-XR terminal). The another terminal 710 may transmit XR data to the XR terminal 730 via the Wi-Fi apparatus 720. Optionally, the system 700 further includes a centralized controller 740. The centralized controller 740 may receive/collect data from one or more of the another terminal 710, the Wi-Fi apparatus 720, or the XR terminal 730, or may send data to one or more of the another terminal 710, the Wi-Fi apparatus 720), or the XR terminal 730. It may be understood that the centralized controller 740) may be deployed independently of the another terminal 710, the Wi-Fi apparatus 720, and the XR terminal 730, or may be deployed in the another terminal 710, the Wi-Fi apparatus 720, or the XR terminal 730. Alternatively, the centralized controller 740 may not be deployed, and a function of the centralized controller 740 is implemented by the another terminal 710, the Wi-Fi apparatus 720, or the XR terminal 730.

Figure 8:
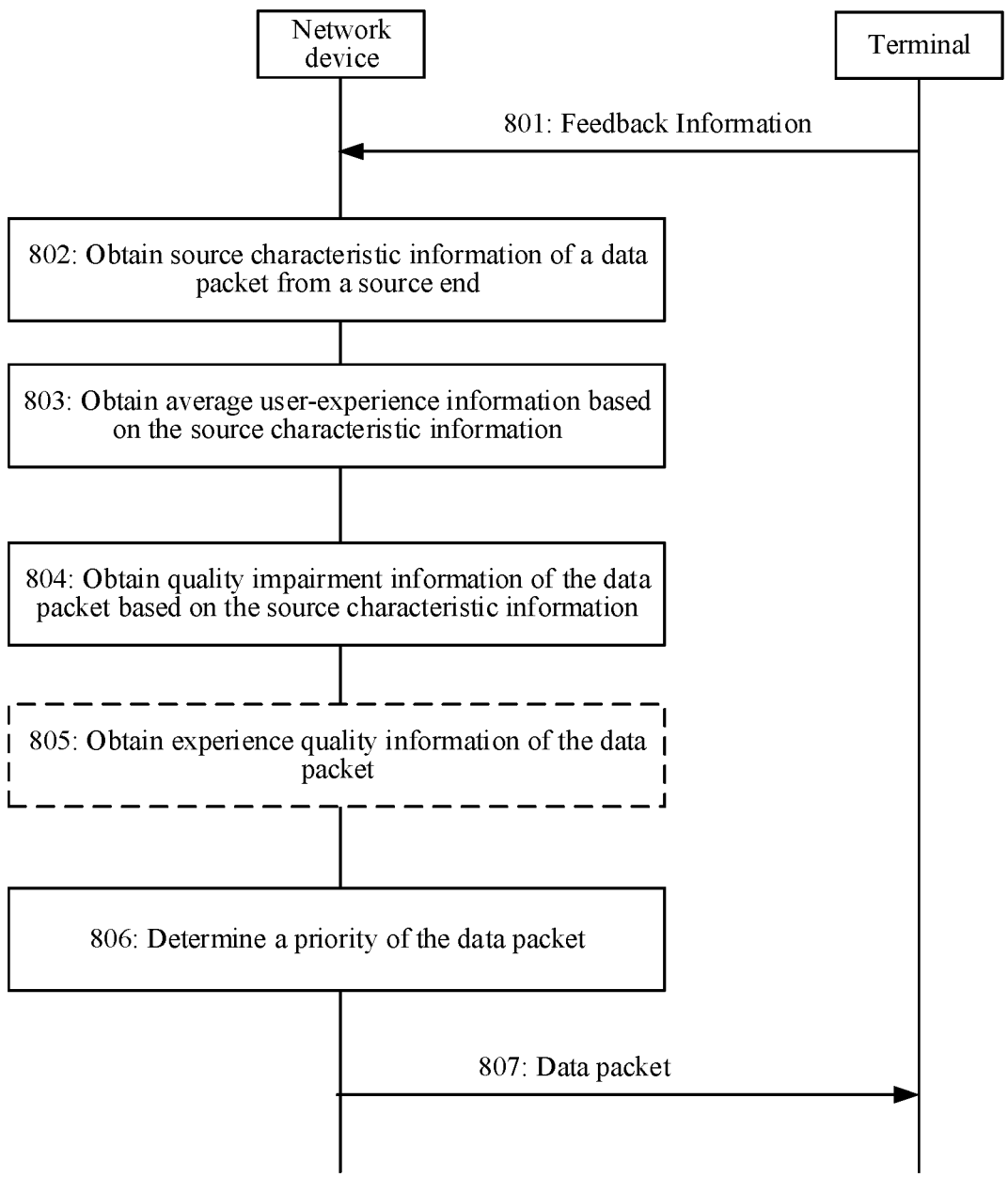
FIG. 8 is a flowchart of a communication method according to an embodiment of this application.

FIG. 8 is a schematic flowchart of a communication method according to an embodiment of this application. A function performed by a terminal (for example, an XR terminal) in the method may alternatively be performed by a chip, a chip system, a processor, or the like that supports the terminal in implementing the method. In the method, a function performed by a network device (for example, a core network device, an access network device, a Wi-Fi router, or a Wi-Fi access point) may alternatively be performed by a chip, a chip system, a processor, or the like that supports the network device in implementing the method. A function performed by a server (for example, a cloud server) in the method may alternatively be performed by a chip, a chip system, a processor, or the like that supports the server in implementing the method. The communication method may be for determining transmission of XR data. As shown in FIG. 8, the communication method may include the following steps.

801: The terminal sends feedback information to the network device.

Accordingly, the network device may obtain the feedback information from the terminal.

The feedback information may be sent by the terminal to the network device after the network device sends, to the terminal, a request for obtaining the feedback information, or may be sent by the terminal to the network device through triggering or periodically. The feedback information indicates a status of receiving and processing a data packet by the terminal. The feedback information may further indicate a capability of processing the data packet. It may be understood as that the capability is for assessing an indicator (namely, end quality) that is of the terminal and that corresponds when the terminal processes the data packet. For example, a data processing capability may be for assessing a capability of the terminal to process and/or display data, for example, a supported field of view (FOV) angle and/or refresh rate. For example, the data processing capability may be further for assessing one or more of indicators such as endurance, wear comfort, wear fatigue, portability, or visual impairment friendliness of the terminal. The feedback information may include packet loss information obtained by receiving and processing the data packet by the terminal, and may further include delay information obtained by receiving and processing the data packet by the terminal.

The feedback information may be determined based on third delay information of the data packet and/or third reliability information of the data packet. The third delay information of the data packet and/or the third reliability information of the data packet may indicate delay information and/or reliability information, for example, on an air interface, of the data transmitted from the network device to the terminal, and delay information and/or reliability information of processing the data packet after receiving the data packet by the terminal. The third delay information of the data packet and/or the third reliability information of the data packet may further indicate end-to-end delay information and/or reliability information of the data from encoding and sending of a source end to receiving and processing of the terminal.

802: The network device obtains source characteristic information of the data packet from the source end.

The network device may obtain the source characteristic information of the data packet from the source end. The source characteristic information may be sent by the source end to the network device after the network device sends, to the source end, a request for obtaining the source characteristic information, or may be sent by the source end to the network device through triggering or periodically. The source end may be a cloud server or another terminal. The source end may perform rendering and encoding/decoding on source data of a service to obtain the data packet and the source characteristic information corresponding to the data packet.

The source characteristic information (for example, media information) indicates source quality of the data packet. It may be understood as that the source quality is for assessing quality (namely, the source quality) that is of the data packet and that corresponds when the data packet is generated. For example, the source quality of the data packet may be for assessing one or more of the following indicators of a video source and/or an audio source: image content, image definition, image smoothness, an image stereoscopic sensation, image distortion, a frame rate, audio quality, or a rendering effect.

The source characteristic information may be related characteristic information of media. Due to security considerations, the source end usually does not directly transmit content of media data, but transmits characteristic information of the media data. The source characteristic information may include GOP information corresponding to the data packet and frame information corresponding to the data packet. The GOP information corresponding to the data packet may be, for example, media GOP information, and the frame information corresponding to the data packet may include a frame type and a frame number of the data packet, position information of the data packet in a frame, and the like. For example, the source characteristic information may be the GOP information, the frame type corresponding to the data packet (an intra-coded picture (I frame), a predictive-coded picture (P frame), or a bidirectionally predicted picture (B frame)), the frame number corresponding to the data packet, a number of macroblocks (NumMBs) (where the macroblock refers to a block area obtained through division during source encoding) included in the data packet, a number of bits included in a macroblock (NumBitsPerMB), a position of the data packet in the frame, namely, measurement of a distance between an area in which the data packet is located and an edge of the frame (DevFromBdr), a number of bits (NumBits) included in a network abstract layer unit (NAL Unit), whether the data packet belongs to a full network abstract layer unit (IsFullUnit and NotFullUnit), and whether the data packet is a whole frame (IsWholeFrame and NotWholeFrame).

It may be understood that, when the source end performs source encoding, if types or positions of video frames generated through the source encoding are different, importance is different. That is, impact on experience quality is different. In addition, if positions of slices, tiles, or macroblocks constituted by the video frame are different, the importance is also different. That is, the impact on the experience quality is different.

It may be understood that, in transmission on a network side, the data packet may include an IP packet and/or a PDCP packet. Specifically, the source end sends the data packet to a core network unit or a routing node, and the core network unit or the routing node receives the IP packet. The core network unit or the routing node sends the data packet to an access network unit (for example, a base station), and the access network unit receives the PDCP packet.

In a possible implementation, the source end and the network device may exchange the source characteristic information of the data packet via a media pipe exchange layer. Specifically, the media pipe exchange layer may be added between an IP protocol layer and an application protocol layer to carry the source characteristic information. The media pipe exchange layer is visible to the source end, the routing node, and the core network unit. That is, the routing node and the core network unit may interpret the source characteristic information included in the media pipe exchange layer, to obtain information related to experience quality of the IP packet. After the core network unit completes interpretation of the source characteristic information, the source characteristic information may be repacked or re-encapsulated into protocol layer information, for example, GTP-U protocol layer information, that may be identified between the core network unit and the base station. Further, a base station side interprets the GTP-U protocol layer information to obtain the source characteristic information of the corresponding PDCP packet.

In a possible implementation, the source characteristic information may alternatively be defined as a piece of new information that may be identified by all of the source end, the core network unit, the routing node, and the base station, to perform end-to-end data transmission.

It may be understood that the network device may obtain the feedback information and the source characteristic information in no sequence, or the network device may obtain the feedback information from the terminal and the source characteristic information from the source end simultaneously. This is not limited in this application.

803: The network device obtains average user-experience information based on the source characteristic information.

There may be two cases in which the network device obtains the average user-experience information based on the source characteristic information.

Case 1:

After obtaining the feedback information from the terminal and the source characteristic information that is of the data packet and that is from the source end, the network device may determine the average user-experience information based on the source characteristic information and the feedback information. Details are as follows:

In an optional implementation, the network device obtains the average user-experience information in a manner such as through function fitting, by using a table, through mapping, or through neural network training based on the source characteristic information of the data packet and available statistical information. For example, the network device obtains average user-experience information A through calculation and function fitting with reference to the obtained source characteristic information based on the available statistical information of the data packet such as a PER, a BLER, and a bitrate, and delay statistical information such as an average delay, first-packet time of arrival T1, and tail-packet scheduling time T2, where A=f(PER, BLER, Delay, BitRate, T1, T2 . . . ), and the network device determines information such as an error packet and an error block based on the feedback information.

In another optional implementation, the network device may obtain the average user-experience information through calculation in a manner of function creation based on the source characteristic information and the feedback information. For example, the network device obtains the average user-experience information through calculation according to a formula based on a mapping relationship that is between the data packet and a video frame, a video frame tile, or a video frame slice and that is included in the obtained source characteristic information. Details are as follows:

The network device may determine one or more of a lost video frame, a lost video frame tile, or a lost video frame slice based on the packet loss information in the feedback information and the source characteristic information; determine stalling experience information based on the one or more of a lost video frame, a lost video frame tile, or a lost video frame slice; and determine the average user-experience information based on the stalling experience information.

Stalling experience may be for describing impact of a freezing phenomenon of all or a part of images that is caused by the one or more of a lost video frame, a lost video frame tile, or a lost video frame slice on user experience. The network device may further determine information such as a frame number or loss position information of the one or more of a lost video frame, a lost video frame tile, or a lost video frame slice based on the source characteristic information.

Optionally, stalling duration and a stalling frequency may be determined based on the one or more of a lost video frame, a lost video frame tile, or a lost video frame slice; and the stalling experience information may be determined based on the stalling duration and the stalling frequency. The stalling duration may be for describing total stalling duration of a video in a play back process. The stalling frequency may be for describing an average number of times of stalling in unit time in a process in which a user watches a video.

In still another optional implementation, the network device may determine one or more of video frame delay information, video frame tile delay information, or video frame slice delay information based on the delay information in the feedback information and the source characteristic information; determine image coherence experience information and/or interaction response experience information based on the one or more of video frame delay information, video frame tile delay information, or video frame slice delay information; and determine the average user-experience information based on the image coherence experience information and/or the interaction response experience information.

Image coherence experience may be for describing image coherence degree experience of the user for video playback, and interaction response experience may be for describing interaction response experience of the user from initiating a request to receiving a video image.

In still another optional implementation, the network device may determine one or more of a lost video frame, a lost video frame tile, or a lost video frame slice based on the packet loss information in the feedback information and the source characteristic information; determine stalling experience information based on the one or more of a lost video frame, a lost video frame tile, or a lost video frame slice; determine one or more of video frame delay information, video frame tile delay information, or video frame slice delay information based on the delay information in the feedback information and the source characteristic information; determine image coherence experience information and/or interaction response experience information based on the one or more of video frame delay information, video frame tile delay information, or video frame slice delay information; and determine the average user-experience information based on the stalling experience information, and the image coherence experience information and/or the interaction response experience information.

Case 2:

The network device may obtain the packet loss information and/or the delay information of the data packet, and determine the average user-experience information based on the source characteristic information and the packet loss information and/or the delay information of the data packet. The average user-experience information may be determined based on the source characteristic information and the packet loss information of the data packet, the average user-experience information may be determined based on the source characteristic information and the delay information of the data packet, or the average user-experience information may be determined based on the source characteristic information, the packet loss information of the data packet, and the delay information of the data packet. Details are as follows:

In an optional implementation, the network device determines one or more of a lost video frame, a lost video frame tile, or a lost video frame slice based on the packet loss information of the data packet and the source characteristic information; determines stalling experience information based on the one or more of a lost video frame, a lost video frame tile, or a lost video frame slice; and determines the average user-experience information based on the stalling experience information.

In another optional implementation, one or more of video frame delay information, video frame tile delay information, or video frame slice delay information are determined based on the delay information of the data packet and the source characteristic information; image coherence experience information and/or interaction response experience information are/is determined based on the one or more of video frame delay information, video frame tile delay information, or video frame slice delay information; and the average user-experience information is determined based on the image coherence experience information and/or the interaction response experience information.

In still another optional implementation, one or more of a lost video frame, a lost video frame tile, or a lost video frame slice are determined based on the packet loss information of the data packet and the source characteristic information; stalling experience information is determined based on the one or more of a lost video frame, a lost video frame tile, or a lost video frame slice; one or more of video frame delay information, video frame tile delay information, or video frame slice delay information are determined based on the delay information of the data packet and the source characteristic information; image coherence experience information and/or interaction response experience information are/is determined based on the one or more of video frame delay information, video frame tile delay information, or video frame slice delay information; and the average user-experience information is determined based on the stalling experience information, and the image coherence experience information and/or the interaction response experience information.

For example, the stalling experience information may be a stalling experience score, the image coherence experience information may be an image coherence experience score, the interaction response experience information may be an interaction response experience score, and the average user-experience information may be an average user-experience score.

The average user-experience information is determined based on the stalling experience information, and the image coherence experience information and/or the interaction response experience information, so that the average user-experience information is determined more accurately, and a network design can be better guided, to send the data packet to the terminal.

804: The network device obtains quality impairment information of the data packet.

The quality impairment information of the data packet may indicate a degree of impact of a data packet loss on experience quality of data received by the user. For example, a position of the data packet in a frame may be known based on the source characteristic information, to determine, based on the position of the data packet, the degree of the impact of the data packet loss on the experience quality of the data received by the user.

The network device may determine the quality impairment information of the data packet based on the source characteristic information of the data packet. Details are as follows:

In an optional implementation, the quality impairment information of the data packet is determined based on the GOP information corresponding to the data packet and the frame information corresponding to the data packet. The GOP information corresponding to the data packet and the frame information corresponding to the data packet may be determined in the source characteristic information. The quality impairment information of the data packet is determined based on the GOP information corresponding to the data packet and the frame information corresponding to the data packet, so that the degree of the impact of the data packet loss on the experience quality of the data received by the user can be accurately determined. For example, the position of the data packet in the frame may be known based on the source characteristic information, to determine, based on the position of the data packet, the degree of the impact of the data packet loss on the experience quality of the data received by the user. For example, the network device may obtain the source characteristic information from the source end, for example, the GOP information corresponding to the data packet, the frame type and the frame number that correspond to the data packet, and the position of the data packet in the frame. Further, a current error propagation range of an error of the data packet is calculated based on the GOP information and the frame number of the data packet. Further, the network device may obtain, through function fitting based on the foregoing information, a current predicted value of experience quality impairment caused by the data packet. Specifically, coefficient of parameters may be obtained through training based on a training set, and then a function fitting formula is obtained. The following formula may be satisfied:

$$\log\left(\frac{p}{1-p}\right) = \alpha + \sum_{j=1}^{k} x_j \beta_j$$

p represents a score of video experience quality, such as a PSNR, VQM, or SSIM, $x_j$ represents the parameters in the foregoing source characteristic information, $\alpha$ and $\beta_j$ represent coefficient values, a value range of j is 1 to k, and k is an integer greater than or equal to 1.

In another optional implementation, the source end may determine the quality impairment information of the data packet based on the source characteristic information of the data packet, and store the quality impairment information of the data packet in header information of the data packet. After the source end sends the data packet to the network device, the network device may parse the header information of the data packet, and determine the quality impairment information of the data packet based on the header information. In this way, the network device may not need to re-determine the quality impairment information of the data packet, to improve a data transmission rate.

Optionally, the network device may further obtain first delay information of the data packet and/or first reliability information of the data packet.

The first delay information of the data packet and/or the first reliability information of the data packet represent/represents data transmission quality. It may be understood as that the data transmission quality is for assessing pipe quality.

In this embodiment of this application, delay information may be for measuring a delay requirement of end-to-end transmission of the data packet in a time dimension. The delay information may further indicate a delay status of the data packet on a transmission node, for example, a delay margin on a current transmission node. Reliability information of the data packet may be for measuring a reliability requirement of the end-to-end transmission of the data packet. The reliability information of the data packet may further indicate a reliability status of the data packet on the transmission node, for example, a reliability requirement of transmission on the current transmission node. The reliability information of the data packet may further include frame integrity information. The frame integrity information may be for measuring a whole frame corresponding to the data packet and a transmission status of the current whole frame.

The network device obtains the first delay information of the data packet and/or the first reliability information of the data packet, for example, a network information record of delay and reliability information of the data packet passing through a node in a transmission process. The network device may determine an end-to-end delay margin on the network device and the reliability requirement of the data packet based on the first delay information of the data packet and/or the first reliability information of the data packet, to determine delay urgency and a robustness requirement of data packet transmission, thereby increasing or decreasing a priority of the data packet transmission based on the delay urgency and the robustness requirement of the data packet transmission. The network device may determine, based on the frame integrity information, a current frame corresponding to the data packet and a transmission status of the current frame, for example, whether the current frame is completely transmitted, and then further determine the priority of the data packet.

Optionally, the delay information may include PDB information and/or delay variation information. The PDB information indicates a PDB, and the PDB indicates duration within which the data packet needs to be correctly transmitted. The delay variation information indicates a variation of a delay. For example, if the PDB information indicates that the PDB is 10 milliseconds (ms), it indicates that the data packet needs to be correctly transmitted within 10 ms.

Optionally, the delay information may further include average delay information and/or delay variance information. The average delay information indicates an average value of the delay or the PDB within a period of time. The delay variance information indicates a variance of the delay.

Optionally, the first delay information of the data packet may include delay impact caused when the source end performs source encoding and delay impact on the data during transmission in a network, for example, from the source end to a core network and/or from the core network to the base station. The foregoing specific delay information can be for measuring, in different dimensions, delay impact on the data during the end-to-end transmission, so that the network design can be guided, and a network operator can be guided to perform network maintenance and optimization based on the delay requirement of the data.

Optionally, the reliability information may include one or more of PER information, BLER information, retransmission information, average packet loss rate information, or burst packet loss rate information. The PER (which may also be referred to as a packet error rate) information indicates a ratio of a number of incorrectly received data packets to a total number of received data packets. The BLER information indicates a ratio of a number of incorrectly received data blocks to a total number of received data blocks. The retransmission information may indicate, for example, a number of times of HARQ retransmission. The average packet loss rate information may indicate a packet loss rate within a period of time. The burst packet loss rate information may indicate a packet loss rate of a burst service with a time period from start to end.

Optionally, the first reliability information of the data packet may include encoding error impact caused when the source end performs source encoding and transmission error impact on the data during transmission in the network, for example, from the source end to the core network and/or from the core network to the base station. The foregoing specific reliability information can be for measuring, in different dimensions, the transmission error impact on the data during the end-to-end transmission, so that the network operator can be guided to perform network maintenance and optimization based on the reliability requirement of the data.

In a possible implementation, the source end and the network device may exchange the first delay information of the data packet and/or the first reliability information of the data packet via the media pipe exchange layer. Specifically, the media pipe exchange layer may be added between the IP protocol layer and the application protocol layer to carry the first delay information and/or the first reliability information of the data packet. The media pipe exchange layer is visible to the source end, the routing node, and the core network unit. That is, the routing node and the core network unit may interpret the first delay information and/or the first reliability information of the data packet that are/is included in the media pipe exchange layer, to obtain the information related to the experience quality of the IP packet. After the core network unit completes interpretation of the first delay information and/or the first reliability information of the data packet, the first delay information and/or the first reliability information of the data packet may be repacked or re-encapsulated into protocol layer information, for example, GTP-U protocol layer information, that may be identified between the core network unit and the base station. Further, the base station side interprets the GTP-U protocol layer information to obtain the first delay information and/or the first reliability information of the data packet that are/is of the corresponding PDCP packet.

In a possible implementation, the first delay information and/or the first reliability information of the data packet may alternatively be defined as a piece of new information that may be identified by all of the source end, the core network unit, the routing node, and the base station, and a protocol on the base station side is changed, so that end-to-end data transmission can be performed.

805: The network device obtains experience quality information of the data packet.

The network device may obtain the experience quality information of the data packet. The experience quality information may also be referred to as a network transmission MOS, a network user experience indicator, or the like. This is not limited in this application. The experience quality information may include at least one of the quality impairment information of the data packet, the average user-experience information, and the first delay information of the data packet and/or the first reliability information of the data packet.

The experience quality information may represent end-to-end user experience of a service. An end-to-end process includes generation of a data packet corresponding to the service, transmission of the data packet, and processing of the data packet. The transmission of the data packet may include data transmission from the source end to the terminal through the network, where the network may include a core network and/or an access network. User experience in the end-to-end process of the data is obtained by integrating transmission quality information of a data source of the data, the terminal, and a transmission pipe, and end-to-end experience quality information can be determined for the data, to guide the network operator to perform network maintenance and optimization based on the experience quality information, so that a data experience requirement of the user is satisfied.

The first delay information of the data packet and/or the first reliability information of the data packet may include delay information and/or reliability information that correspond/corresponds to the core network when the source end performs source encoding, may include delay information and/or reliability information that correspond/corresponds to the access network when the source end performs source encoding, or may include delay information and/or reliability information that correspond/corresponds to the core network and the access network when the source end performs source encoding. Therefore, the first delay information of the data packet and/or the first reliability information of the data packet can reflect impact on the data in transmission in the source end, the core network, and/or the access network. The quality impairment information of the data packet may indicate the degree of the impact of the data packet loss on the experience quality of the data received by the user. The average user-experience information may indicate average experience quality of data received by the user within a period of time. Therefore, the experience quality information can reflect impact on the data in the end-to-end transmission, that is, can reflect service experience quality of the user.

There may be a correspondence between a value range of the experience quality information and a quality impairment prediction, average user-experience of a service, and/or network transmission quality of the data. The average user-experience of the service may be assessed, for example, based on one or more of the following indicators: image definition, image smoothness, image distortion, an image stereoscopic sensation, an image black edge, image smearing, sound quality, a sound effect, a field of view; stalling sensation, artifact sensation, dizziness sensation, audio/video synchronization, interaction freedom, interaction operation response speed, interaction operation accuracy, or content loading speed. In this manner, subjective user experience of the data and objective impact of the network transmission on the data can be better reflected based on the experience quality information, so that the operator can be guided to perform more targeted optimization on the network transmission of the data based on user experience, data quality impairment prediction, and the impact of the network transmission.

Obtaining the experience quality information of the data packet may include:

In an optional implementation, the network device may determine the experience quality information of the data packet based on the quality impairment information of the data packet and/or the average user-experience information. Specifically, the experience quality information of the data packet may satisfy the following formula:

$Y = f(\text{Quality impairment information of a data packet})$;

$Y = f(\text{Average user-experience information})$; or $Y = f(\text{Quality impairment information of a data packet, Average user-experience information})$ Y represents a value corresponding to the experience quality information of the data packet, $f$(Quality impairment information of a data packet) represents a function $f$ using the quality impairment information of the data packet as an independent variable, $f$(Average user-experience information) represents a function $f$ using the average user-experience information as an independent variable, and $f$(Quality impairment information of a data packet, Average user-experience information) represents a function $f$ using the quality impairment information of the data packet and the average user-experience information as independent variables.

For example, the experience quality information of the data packet and the quality impairment information of the data packet and/or the average user-experience information may further satisfy the following formula:

$$Y=\theta*f1;$$

$$Y=\mu*f2; \text{ or}$$

$$Y=\theta*f1+\mu*f2$$

θ and μ are coefficients greater than 0, Y represents a value corresponding to the experience quality information of the data packet, $f1$ represents a value corresponding to the quality impairment information of the data packet, and $f2$ represents a value corresponding to the average user-experience information.

In another optional implementation, the network device may determine the experience quality information of the data packet based on the quality impairment information of the data packet, the average user-experience information, and the first delay information of the data packet and/or the first reliability information of the data packet. Specifically, the experience quality information of the data packet may satisfy the following formula:

$$F=h(\text{Quality impairment information of a data packet, Average user-experience information, First delay information of the data packet and/ or the first reliability information of the data packet})$$

h(Quality impairment information of a data packet, Average user-experience information, First delay information of the data packet and/or the first reliability information of the data packet) represents a function h using the quality impairment information of the data packet, the average user-experience information, and the first delay information of the data packet and/or the first reliability information of the data packet as independent variables.

For example, the experience quality information of the data packet, the quality impairment information of the data packet, the average user-experience information, and the first delay information of the data packet and/or the first reliability information of the data packet may satisfy the following formula:

$$F=\alpha*f1+\beta*f2+\gamma*f3;$$

$$F=\alpha*f1+\beta*f2+\delta*f4; \text{ or}$$

$$F=\alpha*f1+\beta+f2+\gamma*f3+\delta+f4$$

α, β, γ, and δ are coefficients greater than 0, F represents a value corresponding to the experience quality information of the data packet, $f1$ represents a value corresponding to the quality impairment information of the data packet, $f2$ represents a value corresponding to the average user-experience information, $f3$ represents a value corresponding to the first delay information of the data packet, and $f4$ represents a value corresponding to the first reliability information of the data packet.

In still another optional implementation, after determining the experience quality information of the data packet at a protocol layer, the network device may include the experience quality information of the data packet in the header information of the data packet, to facilitate transmission between different protocol layers. In this way, the protocol layer of the network device may transmit the experience quality information of the data packet to a next layer via the header information of the data packet, and the next layer does not need to re-determine the experience quality information of the data packet, thereby improving a transmission rate of the data packet.

806: The network device determines the priority of the data packet.

The network device may determine the priority of the data packet based on the experience quality information of the data packet in a manner such as through formula calculation or neural network training.

In a possible implementation, the network device may determine the priority of the data packet based on the quality impairment information of the data packet and/or the average user-experience information. Specifically, the priority of the data packet may satisfy the following formula:

$$Y=f(\text{Quality impairment information of a data packet});$$

$$Y=f(\text{Average user-experience information}); \text{ or}$$

$$Y=f(\text{Quality impairment information of a data packet, Average user-experience information})$$

Y represents a value corresponding to the priority of the data packet, $f$(Quality impairment information of a data packet) represents a function $f$ using the quality impairment information of the data packet as an independent variable, $f$(Average user-experience information) represents a function $f$ using the average user-experience information an as independent variable, and $f$(Quality impairment information of a data packet, Average user-experience information) represents a function $f$ using the quality impairment information of the data packet and the average user-experience information as independent variables.

For example, the priority of the data packet and the quality impairment information of the data packet and/or the average user-experience information may further satisfy the following formula:

$$Y=\theta*f1;$$

$$Y=\mu*f2; \text{ or}$$

$$Y=\theta*f1+\mu*f2$$

θ and μ are coefficients greater than 0, Y represents a value corresponding to the priority of the data packet, $f1$ represents a value corresponding to the quality impairment information of the data packet, and $f2$ represents a value corresponding to the average user-experience information.

In another optional implementation, the network device may determine the priority of the data packet based on the quality impairment information of the data packet, the average user-experience information, and the first delay information of the data packet and/or the first reliability information of the data packet. Specifically, the priority of the data packet may satisfy the following formula:

$$F=k(\text{Quality impairment information of a data packet, Average user-experience information, First delay information of the data packet and/ or first reliability information of the data packet})$$

k(Quality impairment information of a data packet, Average user-experience information, First delay information of the data packet and/or first reliability information of the data packet) represents a function k using the quality impairment information of the data packet, the average user-experience information, and the first delay information of the data packet and/or the first reliability information of the data packet as independent variables.

For example, the priority of the data packet, the quality impairment information of the data packet, the average user-experience information, and the first delay information of the data packet and/or the first reliability information of the data packet may satisfy the following formula:

$$F=\alpha*f1+\beta*f2+\gamma*f3;$$

$$F=\alpha*f1+\beta*f2+\delta*f4; \text{ or}$$

$$F=\alpha*f1+\beta+f2+\gamma*f3+\delta+f4$$

$\alpha$, $\beta$, $\gamma$, and $\delta$ are coefficients greater than 0, F represents a value corresponding to the priority of the data packet, $f1$ represents a value corresponding to the quality impairment information of the data packet, $f2$ represents a value corresponding to the average user-experience information, $f3$ represents a value corresponding to the first delay information of the data packet, and $f4$ represents a value corresponding to the first reliability information of the data packet.

In still another possible implementation, the network device may determine the priority of the data packet based on the experience quality information of the data packet, where there is a correspondence between the priority of the data packet and the experience quality information of the data packet. For example, Table 2 shows a priority level that is of a data packet and that corresponds to a value range of experience quality information of the data packet. A larger value of the experience quality information of the data packet corresponds to a higher priority level of the data packet. It may be understood that the value range in Table 2 is merely an example, and the value range in Table 2 is not limited in this application.

TABLE 2

| Experience quality X of a data packet | Priority level of the data packet |
| --- | --- |
| X > 4.0 | Highest |
| 4.0 ≥ X > 3.0 | High |
| 3.0 ≥ X > 2.0 | Moderate |
| 2.0 ≥ X > 1.0 | Low |
| 1.0 ≥ X | Lowest |

For another example, Table 3 shows another value that corresponds to a priority of a data packet and that corresponds to a value range of experience quality information of the data packet. A larger value of the experience quality information of the data packet corresponds to a larger value corresponding to the priority of the data packet. It may be understood that the value range in Table 3 is merely an example, and the value range in Table 3 is not limited in this application.

TABLE 3

| Experience quality X of a data packet | Value corresponding to a priority of the data packet |
| --- | --- |
| X > 4.0 | 5 |
| 4.0 ≥ X > 3.0 | 4 |
| 3.0 ≥ X > 2.0 | 3 |

TABLE 3-continued

| Experience quality X of a data packet | Value corresponding to a priority of the data packet |
| --- | --- |
| 2.0 ≥ X > 1.0 | 2 |
| 1.0 ≥ X | 1 |

In still another optional implementation, after determining the priority of the data packet at the protocol layer based on the experience quality information of the data packet, the network device may include priority information of the data packet in the header information, to facilitate transmission between the different protocol layers. For example, importance of the data packet may be classified into eight levels, and 3-bit header information is for representing the eight different importance levels. In this way, the protocol layer of the network device may transmit the priority of the data packet to the next layer via the header information of the data packet, and the next layer does not need to re-determine the priority of the data packet, thereby improving the transmission rate of the data packet.

807: The network device sends the data packet to the terminal based on the priority of the data packet.

After determining the priority of the data packet, the network device may send the data packet to the terminal based on the priority of the data packet.

Specifically, the network device may determine a transmission policy based on a priority of the IP packet and/or a priority of the PDCP packet. For example, a routing node, a core network unit, and the like between the cloud server and the base station may perform routing and congestion control policy selection based on the priority of the IP packet and the like. The base station may determine a transmission and resource scheduling policy based on the priority of the PDCP packet, channel information of an air interface, and the like. For example, more resources are allocated to or a more robust transmission policy is used for a PDCP packet having a high priority.

Optionally, the network device may preferentially send a data packet having a high priority, or allocate more resources to or use a more robust transmission policy for a data packet having a high priority. For example, if a priority level of a first IP packet is the highest, and a priority level of the second IP packet is moderate, the routing node, the core network unit, and the like may preferentially route the first IP packet. For another example, if a value corresponding to a priority of a first PDCP packet is 5, and a value corresponding to a priority of a second PDCP packet is 4, the base station may allocate more resources to the first PDCP packet, and use a lower modulation and coding scheme (MCS) to ensure correct transmission of the first PDCP packet.

Optionally, the network device may further send second delay information of the data packet and/or second reliability information of the data packet to the terminal. The second delay information and/or the second reliability information of the data packet may indicate delay information of the data packet and/or reliability information of the data packet that correspond/corresponds when the network device sends the data packet.

After determining the priority of the data packet, the network device may further send the priority of the data packet to the terminal. The terminal receives the data packet from the network device based on the priority of the data packet. For example, the terminal may preferentially receive the data packet having the high priority.

In a possible implementation, after receiving the data packet from the network device, the terminal may decode the data packet and send the feedback information. Optionally, the terminal may send the feedback information to the network device based on the priority of the data packet. For example, the terminal may preferentially send, to the network device, feedback information of the data packet having the high priority.

It may be understood that, in the communication method shown in FIG. 8, step 805 is an optional step.

Figure 9:
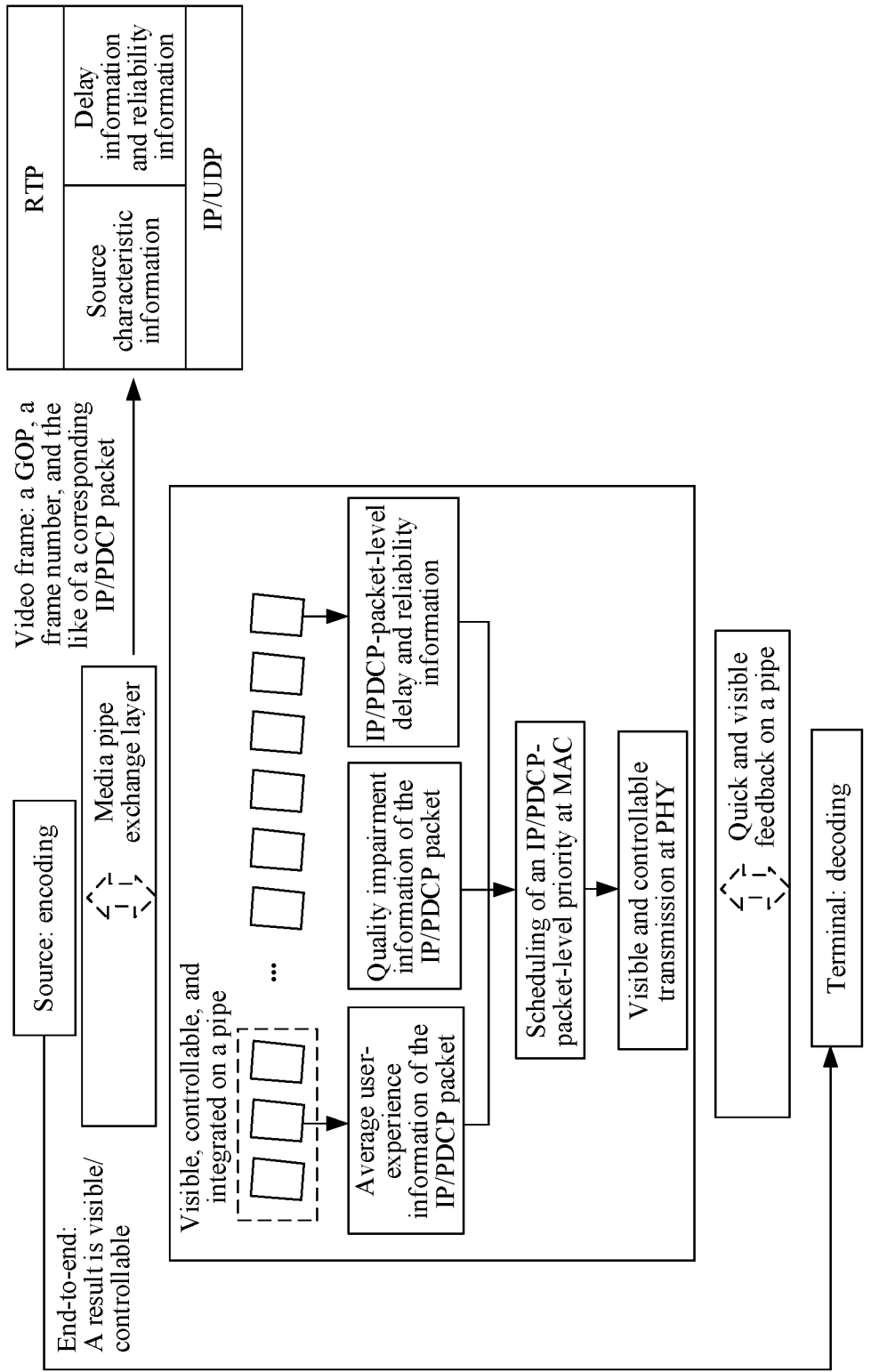
FIG. 9 is a schematic diagram of a communication method according to an embodiment of this application.

According to the foregoing method, for example. FIG. 9 is a schematic diagram of a communication method according to an embodiment of this application. As shown in FIG. 9, the method can systematically assess end-to-end user experience of a service, including impact on data packet generation at a source end, data packet transmission in a network, and data packet processing performed by a terminal. Specifically, the source end may perform source encoding to obtain source characteristic information. The source characteristic information may include GOP information of a video frame and frame information such as a frame number corresponding to an IP packet/PDCP packet corresponding to the video frame. The IP packet/PDCP packet is transmitted from the source end to the terminal through a network transmission channel, and the terminal may perform decoding processing on a data packet. During network transmission, data can be visible, by using the average user-experience information and the quality impairment information of the IP packet/PDCP packet, delay information of the IP packet/PDCP packet, and/or reliability information of the IP packet/PDCP packet, in a transmission process performed through the network transmission pipe. A priority of the IP packet/PDCP packet is determined based on the average user-experience information and the quality impairment information of the IP packet/PDCP packet, the delay information of the IP packet/PDCP packet, and/or the reliability information of the IP packet/PDCP packet. The IP packet/PDCP packet may be sent to the terminal based on the priority. In this way, the data can be controllable in the transmission process performed through the network transmission pipe, so that a network design can be guided, data transmission can be determined, and a network operator can be guided to perform network maintenance and optimization based on a requirement of the data.

Figure 10:
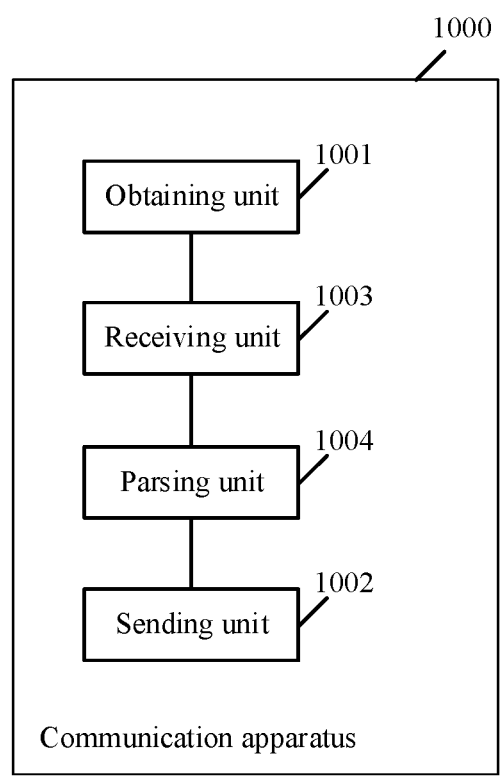
FIG. 10 is a schematic diagram of a structure of a communication apparatus according to an embodiment of this application.

FIG. 10 is a schematic diagram of a structure of a communication apparatus according to an embodiment of this application. As shown in FIG. 10, the communication apparatus may be a network device (for example, a core network device, an access network device, a Wi-Fi router, or a Wi-Fi access point), or may be a chip, a chip system, a processor, or the like that supports the network device. The communication apparatus 1000 includes at least an obtaining unit 1001, a sending unit 1002, a receiving unit 1003, and a parsing unit 1004.

The obtaining unit 1001 is configured to obtain average user-experience information. The obtaining unit 1001 is further configured to obtain quality impairment information of a data packet. The sending unit 1002 is configured to send the data packet to a terminal based on a priority of the data packet, where the priority of the data packet is related to the quality impairment information of the data packet and/or the average user-experience information.

In an embodiment, the obtaining unit 1001 is further configured to:
obtain first delay information of the data packet and/or first reliability information of the data packet, where the priority of the data packet is further related to the first delay information of the data packet and/or the first reliability information of the data packet.

In an embodiment, the priority of the data packet, the quality impairment information of the data packet, the average user-experience information, and the first delay information of the data packet and/or the first reliability information of the data packet satisfy:

$$F=\alpha*f1+\beta*f2+\gamma*f3;$$

$$F=\alpha*f1+\beta*f2+\delta*f4; \text{ or}$$

$$F=\alpha*f1+\beta+f2+\gamma*f3+\delta+f4$$

where $\alpha$, $\beta$, $\gamma$, and $\delta$ are coefficients greater than 0, F represents a value corresponding to the priority of the data packet, $f1$ represents a value corresponding to the quality impairment information of the data packet, $f2$ represents a value corresponding to the average user-experience information, $f3$ represents a value corresponding to the first delay information of the data packet, and $f4$ represents a value corresponding to the first reliability information of the data packet.

In an embodiment, the obtaining unit 1001 is further configured to obtain source characteristic information of the data packet.

In an embodiment, the source characteristic information includes group of pictures GOP information corresponding to the data packet and frame information corresponding to the data packet.

In an embodiment, the obtaining unit 1001 is further configured to:
obtain packet loss information and/or delay information of the data packet.

That the obtaining unit 1001 obtains the average user-experience information includes: determining the average user-experience information based on the source characteristic information and the packet loss information and/or the delay information of the data packet.

In an embodiment, that the obtaining unit 1001 determines the average user-experience information based on the source characteristic information and the packet loss information and/or the delay information of the data packet includes:
determining one or more of a lost video frame, a lost video frame tile, or a lost video frame slice based on the packet loss information of the data packet and the source characteristic information; determining stalling experience information based on the one or more of a lost video frame, a lost video frame tile, or a lost video frame slice; and determining the average user-experience information based on the stalling experience information.

In an embodiment, that the obtaining unit 1001 determines the average user-experience information based on the source characteristic information and the packet loss information and/or the delay information of the data packet includes:
determining one or more of video frame delay information, video frame tile delay information, or video frame slice delay information based on the delay information of the data packet and the source characteristic information; determining image coherence experience information and/or interaction response experience information based on the one or more of video frame delay information, video frame tile delay information, or video frame slice delay information; and determining the average user-experience information based on the image coherence experience information and/or the interaction response experience information.

In an embodiment, that the obtaining unit 1001 determines the average user-experience information based on the source characteristic information and the packet loss information and/or the delay information of the data packet includes:

determining one or more of a lost video frame, a lost video frame tile, or a lost video frame slice based on the packet loss information of the data packet and the source characteristic information; determining stalling experience information based on the one or more of a lost video frame, a lost video frame tile, or a lost video frame slice; determining one or more of video frame delay information, video frame tile delay information, or video frame slice delay information based on the delay information of the data packet and the source characteristic information; determining image coherence experience information and/or interaction response experience information based on the one or more of video frame delay information, video frame tile delay information, or video frame slice delay information; and determining the average user-experience information based on the stalling experience information, and the image coherence experience information and/or the interaction response experience information.

In an embodiment, the obtaining unit 1001 is further configured to:

obtain feedback information from the terminal, where the feedback information indicates a status of receiving and processing the data packet by the terminal. That the obtaining unit 1001 obtains the average user-experience information includes: determining the average user-experience information based on the source characteristic information and the feedback information.

In an embodiment, that the obtaining unit 1001 determines the average user-experience information based on the source characteristic information and the feedback information includes:

determining one or more of a lost video frame, a lost video frame tile, or a lost video frame slice based on packet loss information in the feedback information and the source characteristic information; determining stalling experience information based on the one or more of a lost video frame, a lost video frame tile, or a lost video frame slice; and determining the average user-experience information based on the stalling experience information.

In an embodiment, that the obtaining unit 1001 determines the average user-experience information based on the source characteristic information and the feedback information includes:

determining one or more of video frame delay information, video frame tile delay information, or video frame slice delay information based on delay information in the feedback information and the source characteristic information; determining image coherence experience information and/or interaction response experience information based on the one or more of video frame delay information, video frame tile delay information, or video frame slice delay information; and determining the average user-experience information based on the image coherence experience information and/or the interaction response experience information.

In an embodiment, that the obtaining unit 1001 determines the average user-experience information based on the source characteristic information and the feedback information includes:

determining one or more of a lost video frame, a lost video frame tile, or a lost video frame slice based on packet loss information in the feedback information and the source characteristic information; determining stalling experience information based on the one or more of a lost video frame, a lost video frame tile, or a lost video frame slice; determining one or more of video frame delay information, video frame tile delay information, or video frame slice delay information based on delay information in the feedback information and the source characteristic information;

determining image coherence experience information and/or interaction response experience information based on the one or more of video frame delay information, video frame tile delay information, or video frame slice delay information; and determining the average user-experience information based on the stalling experience information, and the image coherence experience information and/or the interaction response experience information.

In an embodiment, that the obtaining unit 1001 determines the stalling experience information based on the one or more of a lost video frame, a lost video frame tile, or a lost video frame slice includes:

determining stalling duration and a stalling frequency based on the one or more of a lost video frame, a lost video frame tile, or a lost video frame slice; and determining the stalling experience information based on the stalling duration and the stalling frequency.

In an embodiment, that the obtaining unit 1001 obtains the quality impairment information of the data packet includes:

determining the quality impairment information of the data packet based on the source characteristic information.

In an embodiment, that the obtaining unit 1001 determines the quality impairment information of the data packet based on the source characteristic information includes:

determining the quality impairment information of the data packet based on the GOP information corresponding to the data packet and the frame information corresponding to the data packet.

In an embodiment, the communication apparatus further includes:

the receiving unit 1003, configured to receive the data packet; and the parsing unit 1004, configured to parse header information of the data packet. That the obtaining unit 1001 obtains the quality impairment information of the data packet includes: determining the quality impairment information of the data packet based on the header information.

In an embodiment, the sending unit 1002 is further configured to send second delay information of the data packet and/or second reliability information of the data packet to the terminal.

In an embodiment, experience quality information includes at least one of the average user-experience information, the quality impairment information of the data packet, and the first delay information of the data packet and/or the first reliability information of the data packet.

In an embodiment, experience quality information includes the average user-experience information, the quality impairment information of the data packet, delay information of the data packet, and/or reliability information of the data packet.

The obtaining unit 1001 determines the experience quality information based on at least one of the average user-experience information, the quality impairment information of the data packet, and the first delay information of the data packet and/or the first reliability information of the data packet.

One or more units in FIG. 10 may be implemented by one or more processors, may be implemented by one or more processors and one or more memories, may be implemented by one or more processors and one or more transceivers, or may be implemented by one or more processors, one or more memories, and one or more transceivers. This is not limited in this embodiment of this application. The processor, the memory, and the transceiver may be separately disposed, or may be integrated.

The apparatus has a function of implementing the network device described in embodiments of this application. For example, the apparatus includes a corresponding module, unit, or means used by the network device to perform the steps related to the network device and described in embodiments of this application. The function, the unit, or the means may be implemented by software or hardware, may be implemented by hardware executing corresponding software, or may be implemented by a combination of software and hardware. For more detailed descriptions of the obtaining unit 1001, the sending unit 1002, the receiving unit 1003, and the parsing unit 1004, directly refer to related descriptions of the network device in the method embodiment shown in FIG. 8. Details are not described herein again.

Figure 11:
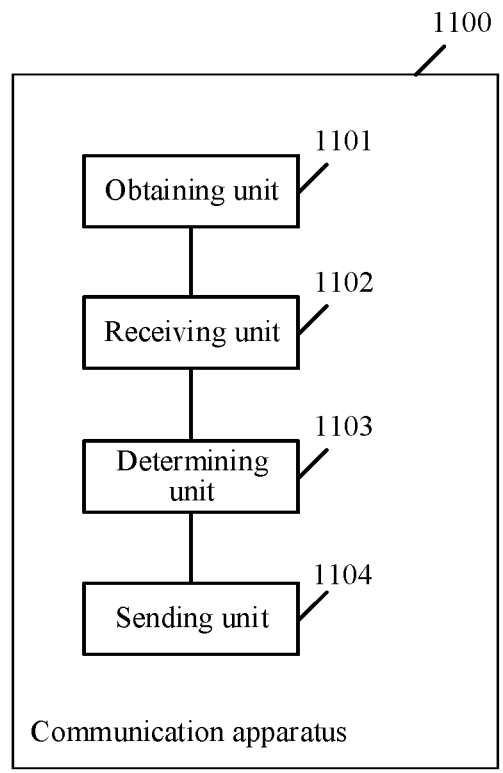
FIG. 11 is a schematic diagram of a structure of another communication apparatus according to an embodiment of this application.

FIG. 11 is a schematic diagram of a structure of another communication apparatus according to an embodiment of this application. As shown in FIG. 11, the communication apparatus may be a terminal (for example, an XR terminal), or may be a chip, a chip system, a processor, or the like that supports the terminal. The communication apparatus 1100 includes at least an obtaining unit 1101, a receiving unit 1102, a determining unit 1103, and a sending unit 1104.

The obtaining unit 1101 is configured to obtain a priority of a data packet. The receiving unit 1102 is configured to receive the data packet from a network device based on the priority of the data packet, where the priority of the data packet is related to quality impairment information of the data packet and/or average user-experience information.

In an embodiment, the priority of the data packet is further related to first delay information of the data packet and/or first reliability information of the data packet.

In an embodiment, the priority of the data packet, the quality impairment information of the data packet, the average user-experience information, and the first delay information of the data packet and/or the first reliability information of the data packet satisfy:

$F=\alpha*f1+\beta*f2+\gamma*f3;$ $F=\alpha*f1+\beta*f2+\delta*f4;$ or $F=\alpha*f1+\beta+f2+\gamma*f3+\delta+f4$ where α, β, γ, and δ are coefficients greater than 0, F represents a value corresponding to the priority of the data packet, $f1$ represents a value corresponding to the quality impairment information of the data packet, $f2$ represents a value corresponding to the average user-experience information, $f3$ represents a value corresponding to the first delay information of the data packet, and $f4$ represents a value corresponding to the first reliability information of the data packet.

In an embodiment, the receiving unit 1102 is further configured to receive second delay information of the data packet and/or second reliability information of the data packet from the network device.

The communication apparatus 1100 further includes:
the determining unit 1103, configured to determine third delay information of the data packet and/or third reliability information of the data packet based on the second delay information of the data packet and/or the second reliability information of the data packet, and determine feedback information of the data packet based on the third delay information of the data packet and/or the third reliability information of the data packet, where the feedback information indicates a status of receiving and processing the data packet by a terminal, and the feedback information includes delay information and packet loss information of the data packet; and
the sending unit 1104, configured to send the feedback information to the network device based on the priority of the data packet.

One or more units in FIG. 11 may be implemented by one or more processors, may be implemented by one or more processors and one or more memories, may be implemented by one or more processors and one or more transceivers, or may be implemented by one or more processors, one or more memories, and one or more transceivers. This is not limited in this embodiment of this application. The processor, the memory, and the transceiver may be separately disposed, or may be integrated.

The apparatus has a function of implementing the terminal described in embodiments of this application. For example, the apparatus includes a corresponding module, unit, or means used by the terminal to perform the steps related to the terminal and described in embodiments of this application. The function, the unit, or the means may be implemented by software or hardware, may be implemented by hardware executing corresponding software, or may be implemented by a combination of software and hardware. For more detailed descriptions of the obtaining unit 1101, the receiving unit 1102, the determining unit 1103, and the sending unit 1104, directly refer to related descriptions of the terminal device in the method embodiment shown in FIG. 8. Details are not described herein again.

Figure 12:
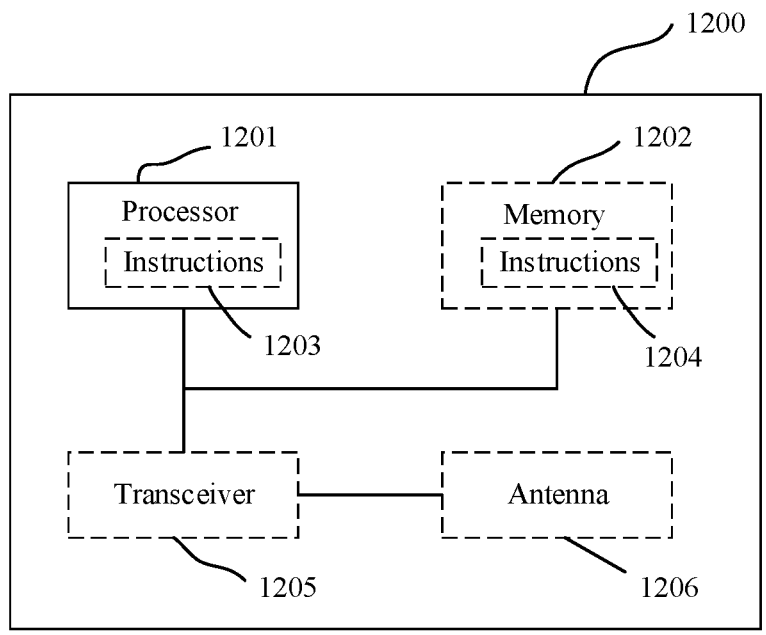
FIG. 12 is a schematic diagram of a structure of still another communication apparatus according to an embodiment of this application.

FIG. 12 is a schematic diagram of a structure of still another communication apparatus according to an embodiment of this application. As shown in FIG. 12, the communication apparatus may be configured to implement the methods described in the foregoing method embodiments. For details, refer to the descriptions in the foregoing method embodiments.

The apparatus 1200 may include one or more processors 1201. The processor 1201 may also be referred to as a processing unit, and may implement a control function. The processor 1201 may be a general-purpose processor, a dedicated processor, or the like. For example, the processor 1201 may be a baseband processor or a central processing unit. The baseband processor may be configured to process a communication protocol and communication data. The central processing unit may be configured to control the communication apparatus (for example, a base station, a baseband chip, a terminal, a terminal chip, a DU, or a CU), execute a software program, and process data of the software program.

In an optional design, the processor 1201 may alternatively store instructions and/or data 1203, and the instructions and/or data 1203 may be run by the processor, to enable the apparatus 1200 to perform the methods in the foregoing method embodiments.

In another optional design, the processor 1201 may include a transceiver unit configured to implement receiving and sending functions. For example, the transceiver unit may be a transceiver circuit, an interface, an interface circuit, or a communication interface. The transceiver circuit, the interface, or the interface circuit configured to implement receiving and sending functions may be separated, or may be integrated together. The transceiver circuit, the interface, or the interface circuit may be configured to read and write code/data, or the transceiver circuit, the interface, or the interface circuit may be configured to transmit or transfer a signal.

In still another possible design, the apparatus 1200 may include a circuit, and the circuit may implement the sending, receiving, or communication function in the foregoing method embodiments.

Optionally, the apparatus 1200 may include one or more memories 1202. The memory may store instructions 1204. The instructions may be run on the processor, so that the apparatus 1200 performs the methods in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 1200 may further include a transceiver 1205 and/or an antenna 1206. The processor 1201 may be referred to as a processing unit, and control the apparatus 1200. The transceiver 1205 may be referred to as a transceiver unit, a transceiver circuit, a transceiver apparatus, a transceiver module, or the like, and is configured to implement a transceiver function.

Optionally, the apparatus 1200 in this embodiment of this application may be configured to perform the method in FIG. 8 in embodiments of this application.

In an embodiment, the communication apparatus 1200 may be a network device (for example, a core network device, an access network device, a Wi-Fi router, or a Wi-Fi access point), or may be a chip, a chip system, a processor, or the like that supports the network device. When computer program instructions stored in the memory 1202 are executed, the processor 1201 is configured to perform operations performed by the obtaining unit 1001 and the parsing unit 1004 in the foregoing embodiment, and the transceiver 1205 is configured to perform operations performed by the sending unit 1002 and the receiving unit 1003 in the foregoing embodiment. The network device, or the chip, the chip system, the processor, or the like that supports the network device may be further configured to perform the methods performed by the network device in the method embodiment in FIG. 8. Details are not described again.

In an embodiment, the communication apparatus 1200 may be a terminal (for example, an XR terminal), or may be a chip, a chip system, a processor, or the like that supports the terminal. When computer program instructions stored in the memory 1202 are executed, the processor 1201 is configured to perform operations performed by the obtaining unit 1101 and the determining unit 1103 in the foregoing embodiment, and the transceiver 1205 is configured to perform operations performed by the receiving unit 1102 and the sending unit 1104 in the foregoing embodiment. The terminal, or the chip, the chip system, the processor, or the like that supports the terminal may be further configured to perform the methods performed by the terminal in the method embodiment in FIG. 8. Details are not described again.

The processor and the transceiver in this application may be implemented on an integrated circuit (IC), an analog IC, a radio frequency integrated circuit RFIC, a mixed-signal IC, an application specific integrated circuit (ASIC), a printed circuit board (PCB), an electronic device, or the like. The processor and the transceiver may also be fabricated by using various IC process technologies, for example, a complementary metal oxide semiconductor (CMOS), an n-type metal oxide semiconductor (NMOS), a positive channel metal oxide semiconductor (PMOS), a bipolar junction transistor (BJT), a bipolar CMOS (BiCMOS), silicon germanium (SiGe), and gallium arsenide (GaAs).

The apparatus in the foregoing embodiment may be the network device or the terminal device. However, a range of the apparatus in this application is not limited thereto, and a structure of the apparatus may not be limited to FIG. 12. The apparatus may be an independent device, or may be a part of a large device. For example, the apparatus may be:

(1) an independent integrated circuit IC, a chip, or a chip system or subsystem:

(2) a set of one or more ICs, where optionally, the IC set may also include a storage component configured to store data and/or instructions:

(3) an ASIC such as a modem (MSM):

(4) a module that can be embedded in another device:

(5) a receiver, a terminal, an intelligent terminal, a cellular phone, a wireless device, a handheld device, a mobile unit, a vehicle-mounted device, a network device, a cloud device, an artificial intelligence device, a machine device, a household device, a medical device, an industrial device, and the like; and (6) others.

Figure 13:
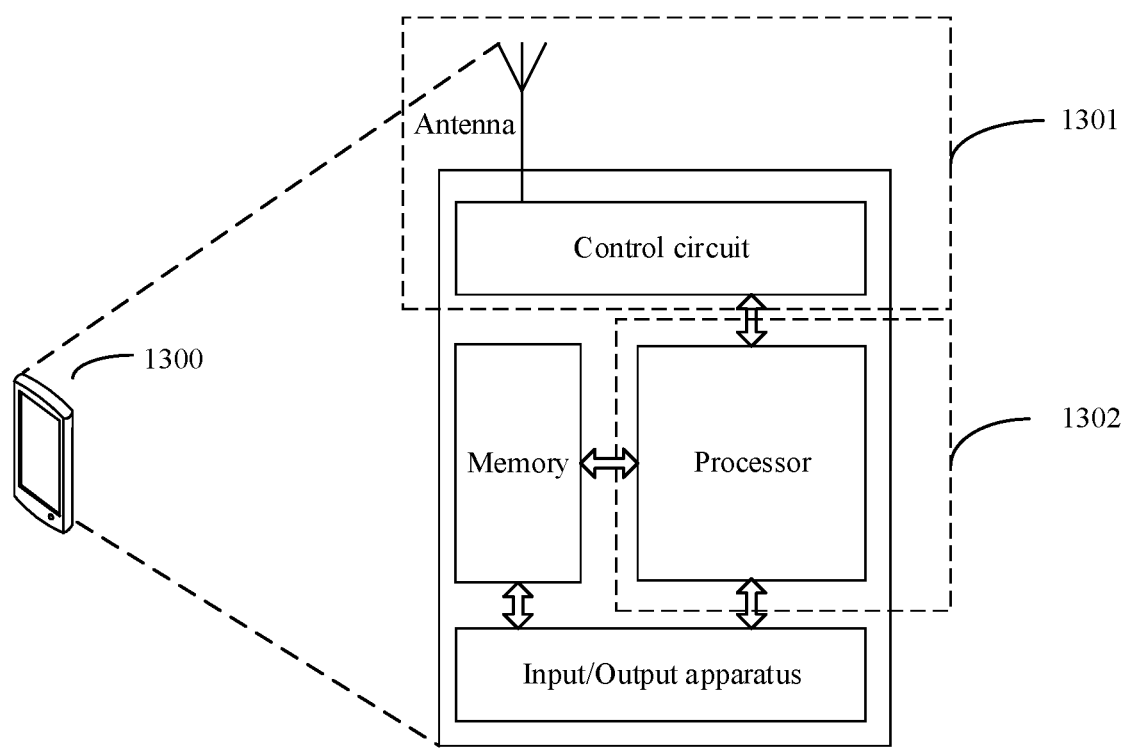
FIG. 13 is a schematic diagram of a structure of a terminal according to an embodiment of this application.

FIG. 13 is a schematic diagram of a structure of a terminal according to an embodiment of this application. For ease of description, FIG. 13 shows only main components of the terminal device. As shown in FIG. 13, the terminal device 1300 includes a processor, a memory; a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display; or a key board, is mainly configured to receive data input by a user and output data to the user.

After the terminal device is powered on the processor may read a software program in a storage unit, parse and execute instructions of the software program, and process data of the software program. When data needs to be sent wirelessly, the processor performs baseband processing on the to-be-sent data, and then outputs a baseband signal to the radio frequency circuit. The radio frequency circuit processes the baseband signal to obtain a radio frequency signal, and then sends, through the antenna, the radio frequency signal in a form of an electromagnetic wave. When data is sent to the terminal device, the radio frequency circuit receives a radio frequency signal through the antenna, the radio frequency signal is further converted into a baseband signal, and the baseband signal is output to the processor. The processor converts the baseband signal into data, and processes the data.

For ease of description. FIG. 13 shows only one memory and one processor. An actual terminal device may include a plurality of processors and a plurality of memories. The memory may also be referred to as a storage medium, a storage device, or the like. This is not limited in this embodiment of the present application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 13 integrates functions of the baseband processor and the central processing unit. A person skilled in the art may understand that, alternatively, the baseband processor and the central processing unit may be independent processors, and interconnected by using a technology such as a bus. A person skilled in the art may understand that the terminal device may include a plurality of baseband processors to adapt to different network standards, the terminal device may include a plurality of central processing units to enhance processing capabilities of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of the software program. The processor executes the software program to implement a baseband processing function.

In an example, the antenna and the control circuit that have a transceiver function may be considered as a transceiver unit 1301 of the terminal device 1300, and the processor that has a processing function may be considered as a processing unit 1302 of the terminal device 1300. As shown in FIG. 13, the terminal device 1300) includes the transceiver unit 1301 and the processing unit 1302. The transceiver unit may also be referred to as a transceiver, a transceiver apparatus, or the like. Optionally, a component that is in the transceiver unit 1301 and that is configured to implement a receiving function may be considered as a receiving unit, and a component that is in the transceiver unit 1301 and that is configured to implement a sending function may be considered as a sending unit. That is, the transceiver unit 1301 includes the receiving unit and the sending unit. For example, the receiving unit may also be referred to as a receiver, a receiver circuit, or the like, and the sending unit may also be referred to as a transmitter, a transmitter circuit, or the like. Optionally, the receiving unit and the sending unit may be one integrated unit, or may be a plurality of independent units. The receiving unit and the sending unit may be in one geographical position, or may be distributed in a plurality of geographical positions.

In an embodiment, the processing unit 1302 is configured to perform operations performed by the obtaining unit 1101 and the determining unit 1103 in the foregoing embodiment, and the transceiver unit 1301 is configured to perform operations performed by the receiving unit 1102 and the sending unit 1104 in the foregoing embodiment. The terminal 1300 may be further configured to perform various methods performed by the terminal in the method embodiment in FIG. 8. Details are not described again.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features may be combined with another feature based on a requirement. Correspondingly, the apparatus provided in embodiments of this application may also correspondingly implement these features or functions. Details are not described herein.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the functions for corresponding application, but it should not be considered that the implementation goes beyond the protection scope of embodiments of this application.

It may be understood that the processor in embodiments of this application may be an integrated circuit chip, and has a signal processing capability. In an implementation process, steps in the foregoing method embodiments may be implemented by using an integrated logic circuit of hardware in the processor, or by using instructions in a form of software. The foregoing processor may be a general-purpose processor, a digital signal processor (DSP), an application specific integrated circuit (ASIC), a field programmable gate array (FPGA) or another programmable logic device, a discrete gate or a transistor logic device, or a discrete hardware component.

The solutions in this application may be implemented in various manners. For example, these technologies may be implemented by using hardware, software, or a combination of the hardware and the software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

It may be understood that the memory in embodiments of this application may be a transitory memory or a non-transitory memory, or may include a transitory memory and a non-transitory memory. The non-transitory memory may be a read-only memory (readROM), a programmable read-only memory (programmable ROM. PROM), an erasable programmable read-only memory (erasable PROM. EPROM), an electrically erasable programmable read-only memory (electrically EPROM. EEPROM), or a flash memory. The transitory memory may be a random access memory (RAM) that is used as an external cache. By way of example but not limitative description, many forms of RAMs may be used, for example, a static random access memory (static RAM. SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the method in this specification aims to include, but not limited to, these and any memory of another proper type.

This application further provides a computer-readable medium. The computer-readable medium stores a computer program. When the computer program is executed by a computer, the function in any one of the foregoing method embodiments is implemented.

This application further provides a computer program product. When the computer program product is executed by a computer, the function in any one of the foregoing method embodiments is implemented.

This application further provides a communication system. The communication system includes a network device and a terminal. For specific descriptions, refer to the communication method shown in FIG. 8.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It may be understood that "an embodiment" mentioned in the whole specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any proper manner. It may be understood that, in various embodiments of this application, sequence numbers of the foregoing processes do not mean an execution sequence. An execution sequence of the processes should be determined based on functions and internal logic of the processes, and should not constitute any limitation on an implementation process of embodiments of this application.

It may be understood that, in this application, "when" and "if" both mean that the apparatus performs corresponding processing in an objective situation, are not intended to limit time, do not require the apparatus to necessarily have a determining action during implementation, and do not mean other limitation.

"Simultaneously" in this application may be understood as being at a same time point, may be understood as being within a time period, or may be understood as being within a same periodicity.

A person skilled in the art may understand that first, second, and various numerals in this application are only for distinguishing for ease of description, and are not for limiting the scope of embodiments of this application. A specific value of a numeral (which may also be referred to as an index), a specific value of a number, and a position in this application are only used as examples, but are not unique representation forms, and are not for limiting the scope of embodiments of this application. First, second, and various numerals in this application are also only for distinguishing for ease of description, and are not for limiting the scope of embodiments of this application.

In this application, an element represented in a singular form is intended to represent "one or more", but does not represent "only one", unless otherwise specified. In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship between associated objects and represents that three relationships may exist. For example, A and/or B may represent the following three cases: Only A exists, both A and B exist, and only B exists. A may be singular or plural, and B may be singular or plural. The character "/" generally indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B, and C all exist. A may be singular or plural, B may be singular or plural, and C may be singular or plural.

It may be understood that, in embodiments of this application, "B corresponding to A" indicates that B is associated with A, and B may be determined based on A. However, it should be further understood that determining B based on A does not mean that B is determined based on only A, that is, B may also be determined based on A and/or other information.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store". "pre-store", "pre-negotiate". "pre-configure", "solidify", or "pre-burn".

A person of ordinary skill in the art may understand that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the functions for all particular applications, but it should not be considered that the implementation goes beyond the scope of this application.

A person of ordinary skill in the art may understand that, for the purpose of convenient and brief description, for a detailed working process of the foregoing system, apparatus, and unit, refer to a corresponding process in the foregoing method embodiment. Details are not described herein again.

It may be understood that the system, the apparatus, and the method described in this application may alternatively be implemented in another manner. For example, the foregoing apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions in embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (ROM), a random access memory (RAM), a magnetic disk, or a compact disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing implementations of this application are not intended to limit the protection scope of this application.

The foregoing descriptions are merely specific implementations of this application, but the protection scope of this application is not limited thereto. Any variation or replacement readily figured out by a person skilled in the art within the technical scope disclosed in this application shall fall within the protection scope of this application.

What is claimed is:

1. A communication method applied to a processor of a communication apparatus, the method comprising:
    obtaining average user-experience information;
    obtaining quality impairment information of a data packet:
    sending the data packet to a terminal based on a priority of the data packet, wherein the priority of the data packet is related to both the quality impairment information of the data packet and the average user-experience information; and
    wherein the quality impairment information of the data packet indicates a degree of impact of a data packet loss on experience quality of data received by a user, and the average user-experience information indicates average experience quality of data received by the user within a period of time.

2. The method according to claim 1, further comprising:
    obtaining at least one of first delay information of the data packet or first reliability information of the data packet, wherein
    the priority of the data packet is further related to at least one of the first delay information of the data packet or the first reliability information of the data packet.

3. The method according to claim 2, wherein the priority of the data packet, the quality impairment information of the data packet, the average user-experience information, and at least one of the first delay information of the data packet or the first reliability information of the data packet satisfy:

$$F=\alpha*f1+\beta*f2+\gamma*f3:$$

$$F=\alpha*f1+\beta*f2+\delta*f4; \text{ or}$$

$$F=\alpha*f1+\beta*f2+\gamma*f3+\delta*f4$$

wherein $\alpha$, $\beta$, $\gamma$, and $\delta$ are coefficients greater than 0, F represents a value corresponding to the priority of the data packet, $f1$ represents a value corresponding to the quality impairment information of the data packet, $f2$ represents a value corresponding to the average user-experience information, $f3$ represents a value corresponding to the first delay information of the data packet, and ƒ4 represents a value corresponding to the first reliability information of the data packet.

4. The method according to claim 1, further comprising:
obtaining source characteristic information of the data packet.

5. The method according to claim 4, wherein the source characteristic information comprises group of pictures (GOP) information corresponding to the data packet and frame information corresponding to the data packet.

6. The method according to claim 4, further comprising:
obtaining feedback information from the terminal, wherein the feedback information indicates a status of receiving and processing the data packet by the terminal; and
wherein the obtaining the average user-experience information comprises:
determining the average user-experience information based on the source characteristic information and the feedback information.

7. The method according to claim 4, wherein the obtaining the quality impairment information of the data packet comprises:
determining the quality impairment information of the data packet based on the source characteristic information.

8. An apparatus comprising:
one or more processors; and
a memory having instructions stored thereon that, when executed by the one or more processors, cause the apparatus to:
obtain average user-experience information;
obtain quality impairment information of a data packet;
send the data packet to a terminal based on a priority of the data packet, wherein the priority of the data packet is related to both the quality impairment information of the data packet and the average user-experience information; and
wherein the quality impairment information of the data packet indicates a degree of impact of a data packet loss on experience quality of data received by a user, and the average user-experience information indicates average experience quality of data received by the user within a period of time.

9. The apparatus according to claim 8, wherein upon the instructions being executed by the one or more processors, the apparatus is further caused to:
obtain at least one of first delay information of the data packet or first reliability information of the data packet, wherein
the priority of the data packet is further related to at least one of the first delay information of the data packet or the first reliability information of the data packet.

10. The apparatus according to claim 9, wherein the priority of the data packet, the quality impairment information of the data packet, the average user-experience information, and at least one of the first delay information of the data packet or the first reliability information of the data packet satisfy:

$$F=\alpha*f1+\beta*f2+\gamma*f3;$$

$$F=\alpha*f1+\beta*f2+\delta*f4; \text{ or}$$

$$F=\alpha*f1+\beta*f2+\gamma*f3+\delta*f4$$

wherein $\alpha$, $\beta$, $\gamma$, and $\delta$ are coefficients greater than 0, F represents a value corresponding to the priority of the data packet, ƒ1 represents a value corresponding to the quality impairment information of the data packet, ƒ2 represents a value corresponding to the average user-experience information, ƒ3 represents a value corresponding to the first delay information of the data packet, and ƒ4 represents a value corresponding to the first reliability information of the data packet.

11. The apparatus according to claim 8, wherein upon the instructions being executed by the one or more processors, the apparatus is further caused to:
obtain source characteristic information of the data packet.

12. The apparatus according to claim 11, wherein the source characteristic information comprises group of pictures (GOP) information corresponding to the data packet and frame information corresponding to the data packet.

13. The apparatus according to claim 11, wherein upon the instructions being executed by the one or more processors, the apparatus is further caused to:
obtain feedback information from the terminal, wherein the feedback information indicates a status of receiving and processing the data packet by the terminal; and
wherein the obtaining the average user-experience information further comprises:
determining the average user-experience information based on the source characteristic information and the feedback information.

14. The apparatus according to claim 11, wherein the obtaining the quality impairment information of the data packet further comprises:
determining the quality impairment information of the data packet based on the source characteristic information.

15. A non-transitory computer readable medium storing computer-executable instructions, upon execution by a processor of a first communication apparatus, facilitating performance of the following operations including:
obtaining average user-experience information;
obtaining quality impairment information of a data packet;
sending the data packet to a terminal based on a priority of the data packet, wherein the priority of the data packet is related to both the quality impairment information of the data packet and the average user-experience information; and
wherein the quality impairment information of the data packet indicates a degree of impact of a data packet loss on experience quality of data received by a user, and the average user-experience information indicates average experience quality of data received by the user within a period of time.

16. The non-transitory computer readable medium according to claim 15, wherein the operations further include:
obtaining at least one of first delay information of the data packet or first reliability information of the data packet, wherein
the priority of the data packet is further related to at least one of the first delay information of the data packet or the first reliability information of the data packet.

17. The non-transitory computer readable medium according to claim 16, wherein the priority of the data packet, the quality impairment information of the data packet, the average user-experience information, and at least one of the first delay information of the data packet or the first reliability information of the data packet satisfy:

$$F=\alpha*f1+\beta*f2+\gamma*f3;$$

$$F=\alpha*f1+\beta*f2+\delta*f4; \text{ or}$$

$$F=\alpha*f1+\beta*f2+\gamma*f3+\delta*f4$$

wherein $\alpha$, $\beta$, $\gamma$, and $\delta$ are coefficients greater than 0, F represents a value corresponding to the priority of the data packet, $f1$ represents a value corresponding to the quality impairment information of the data packet, $f2$ represents a value corresponding to the average user-experience information, $f3$ represents a value corresponding to the first delay information of the data packet, and $f4$ represents a value corresponding to the first reliability information of the data packet.

18. The non-transitory computer readable medium according to claim 15, wherein the operations further include:
obtaining source characteristic information of the data packet.

19. The non-transitory computer readable medium according to claim 18, wherein the operations further include:
obtaining feedback information from the terminal, wherein the feedback information indicates a status of receiving and processing the data packet by the terminal;
wherein the operation of obtaining the average user-experience information further comprises:
determining the average user-experience information based on the source characteristic information and the feedback information.

20. The non-transitory computer readable medium according to claim 18, wherein the operation of obtaining the quality impairment information of the data packet comprises:
determining the quality impairment information of the data packet based on the source characteristic information.

\* \* \* \* \*